United States Patent
Aikawa

(10) Patent No.: US 7,891,211 B2
(45) Date of Patent: Feb. 22, 2011

(54) COLD STORAGE TANK UNIT AND REFRIGERATION CYCLE APPARATUS USING THE SAME

(75) Inventor: Yasukazu Aikawa, Nagoya (JP)

(73) Assignee: Denso Corporation, Kariya (JP)

( * ) Notice: Subject to any disclaimer, the term of this patent is extended or adjusted under 35 U.S.C. 154(b) by 1280 days.

(21) Appl. No.: 11/473,405

(22) Filed: Jun. 22, 2006

(65) Prior Publication Data

US 2006/0288727 A1   Dec. 28, 2006

(30) Foreign Application Priority Data

Jun. 24, 2005 (JP) .............................. 2005-185486
Sep. 20, 2005 (JP) .............................. 2005-272521
Mar. 31, 2006 (JP) .............................. 2006-096852

(51) Int. Cl.
   *F25D 17/02* (2006.01)
(52) U.S. Cl. ......................................... 62/434; 62/509
(58) Field of Classification Search .................. 62/434, 62/509, 438; 165/104.17
   See application file for complete search history.

(56) References Cited

U.S. PATENT DOCUMENTS

| | | | |
|---|---|---|---|
| 4,894,077 A * | 1/1990 | Simon et al. ..................... | 62/59 |
| 5,944,089 A * | 8/1999 | Roland .......................... | 165/10 |
| 6,101,830 A * | 8/2000 | Feuerecker ..................... | 62/304 |
| 6,449,979 B1 | 9/2002 | Nagasawa et al. | |
| 6,568,205 B2 | 5/2003 | Bureau et al. | |
| 6,691,527 B2 | 2/2004 | Bureau et al. | |
| 6,701,731 B2 | 3/2004 | Aikawa et al. | |
| 6,854,286 B2 | 2/2005 | Bureau et al. | |
| 6,935,128 B2 | 8/2005 | Ito et al. | |

FOREIGN PATENT DOCUMENTS

| | | |
|---|---|---|
| JP | 51-063556 | 5/1976 |
| JP | 01-153321 | 6/1989 |

(Continued)

OTHER PUBLICATIONS

Notice of Preliminary Rejection issued in corresponding Korean patent application No. 10-2006-0057148 dated Mar. 28, 2007 with English translation.
Office Action dated Dec. 22, 2009 from the Japan Patent Office in the corresponding patent application No. 2005-185486.
Office action dated Aug. 17, 2010 in corresponding Japanese Application No. 2006-096852.

*Primary Examiner*—Melvin Jones
(74) *Attorney, Agent, or Firm*—Harness, Dickey & Pierce, PLC

(57) ABSTRACT

A cold storage tank unit for a refrigeration cycle apparatus includes a cold storage heat exchanger having plural tubes and a pair of first and second tanks connected to longitudinal ends of the tubes, a cold storage material tank which accommodates at least the tubes of the cold storage heat exchanger, and a cold storage material filled in the cold storage material tank. The cold storage material is cold-stored by the refrigerant or is cold-released to cool gas refrigerant evaporated in the evaporator. Furthermore, the second tank has a lower end portion that is positioned lower than a lower end portion of the first tank, and the second tank has a tank capacity capable of storing a predetermined liquid refrigerant condensed by cold storage heat of the cold storage material. The cold storage tank unit can be located between an evaporator and a compressor in the refrigeration cycle apparatus.

19 Claims, 15 Drawing Sheets

FOREIGN PATENT DOCUMENTS

| | | |
|---|---|---|
| JP | 06-88687 | 3/1994 |
| JP | 2000-094953 | 4/2000 |
| JP | 2004-270966 A | 3/2003 |
| JP | 2003-307399 | 10/2003 |
| JP | 2004-175232 | 6/2004 |
| JP | 2005-180740 | 7/2005 |
| JP | 2005-262958 | 9/2005 |

* cited by examiner

FIG. 25
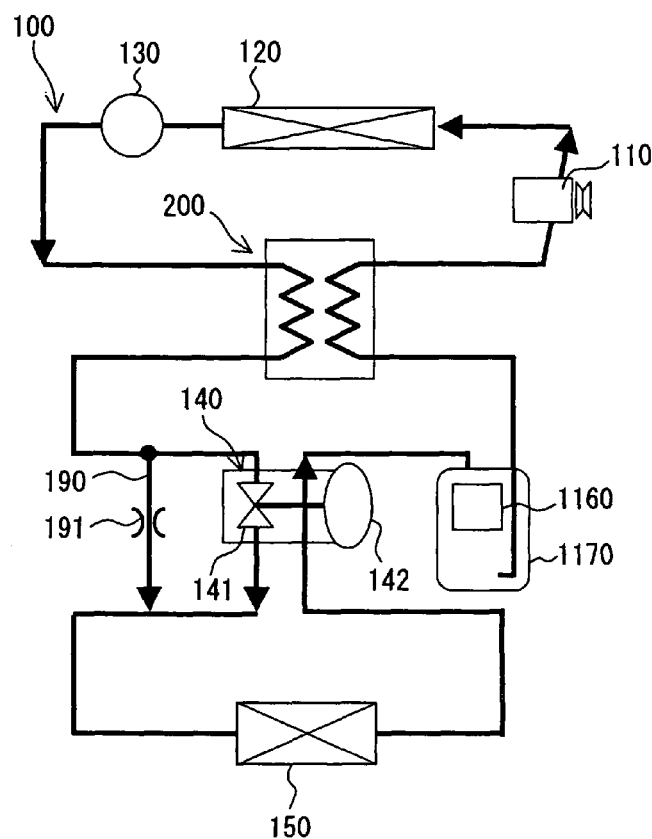
FIG. 26A      FIG. 26B      FIG. 26C
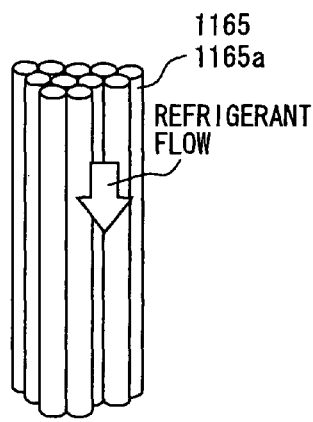
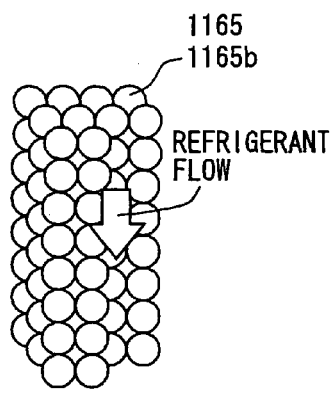
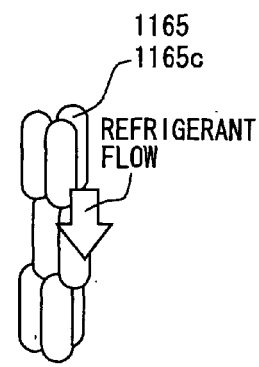

COLD STORAGE TANK UNIT AND REFRIGERATION CYCLE APPARATUS USING THE SAME

CROSS REFERENCE TO RELATED APPLICATION

This application is based on Japanese Patent Applications No. 2005-185486 filed on Jun. 24, 2005, No. 2005-272521 filed on Sep. 20, 2005, and No. 2006-96852 filed on Mar. 31, 2006, the contents of which are incorporated herein by reference in its entirety.

BACKGROUND OF THE INVENTION

1. Field of the Invention

The present invention relates to a cold storage tank unit and a refrigeration cycle apparatus using the same.

2. Description of the Related Art

In an air conditioner for a vehicle, for example, disclosed in JP-A 2004-51077 (corresponding to U.S. Pat. No. 6,701,731), a refrigeration capacity (cooling capacity) in an evaporator can be obtained even after a refrigeration cycle is stopped. That is, this air conditioner is provided with a cold storage heat exchanger, which has a cold storage material and is arranged in series with an evaporator of a refrigeration cycle, and a tank unit in which this cold storage heat exchanger and pump means for circulating liquid refrigerant are integrally built. Moreover, a liquid refrigerant tank part for storing liquid refrigerant is integrally formed under the tank unit. In this regard, as the above-mentioned cold storage heat exchanger is used a heat exchanger in which multiple refrigerant tubes are arranged in such a way as to pass through a container (e.g., shell) filled with a cold storage material, or a heat exchanger in which multiple cold storage containers each shaped like a cylinder, a ball, or a capsule and filled with a cold storage material are bundled and in which interspaces between the respective cold storage containers are used as passages for refrigerant.

When an engine of a vehicle is operated, a compressor of the refrigeration cycle is operated and the cold storage material in the cold storage heat exchanger is cooled by low-pressure refrigerant having pressure-reduced by an expansion valve, whereby cold is stored. In contrast, when the engine of the vehicle is stopped and the compressor is stopped, liquid refrigerant stored in the liquid refrigerant tank part is introduced into the evaporator by the pump means for circulating liquid refrigerant, and is evaporated by the evaporator. Furthermore, the evaporated vapor-phase refrigerant is introduced into the cold storage heat exchanger and is cooled and condensed by the cold (cold release) of the cold storage material and is stored in the liquid refrigerant tank part. This cycle is repeated to continue air conditioning while the engine of the vehicle is stopped.

However, the above-mentioned cold storage heat exchanger has a structure in which the shell or the cold storage container filled with the cold storage material is exposed to refrigerant and receives the pressure of the refrigerant. Hence, the shell or the cold storage container needs to be designed to endure the pressure of the refrigerant to thereby increase its thickness so as to secure strength. Hence, this hinders size reduction and causes to increase material cost because high-strength material needs to be selected.

In a vehicle air conditioner with a refrigerant cycle described in JP-A-2002-274165 (corresponding to U.S. Pat. No. 6,854,286, U.S. Pat. No. 6,691,527, U.S. Pat. No. 6,568,205) there are provided with a first evaporator for normally cooling air to be blown into a vehicle compartment, and a second evaporator provided with a cold storage material. In this case, when a vehicle engine is operated, the first evaporator cools air to be blown into the vehicle compartment, and the cold storage material is frozen in the second evaporator. Furthermore, in a maximum cooling mode (cold down mode), the air to be blown into the vehicle compartment is cooled by using both the first and second evaporators. In contrast, when a compressor of the refrigerant cycle is stopped by a stoppage of the vehicle engine, air to be blown into the vehicle compartment is cooled by a cold release of the cold storage material in the second evaporator.

However, because both the first and second evaporators are arranged in an air guiding case disposed in the vehicle compartment, the air guiding case becomes larger due to both the first and second evaporators. When the sizes of the first and second evaporators are made small, the cooling capacities of the first and second evaporators are deteriorated.

SUMMARY OF THE INVENTION

In view of the foregoing problems, it is an object of the present invention to provide a cold storage tank unit that can obtain desired heat transfer performance relating to cold storage and cold release and can reduce size and cost.

It is another object of the present invention to provide a refrigeration cycle apparatus using a cold storage tank unit.

It is further another object of the present invention to provide a refrigeration cycle apparatus having a single evaporator located in a vehicle compartment, which can continuously perform a cooling operation even when a compressor stops.

According to an aspect of the present invention, a cold storage tank unit arranged in series with an evaporator on a low pressure side after pressure-reduced in a refrigeration cycle apparatus, includes: a cold storage heat exchanger having a plurality of tubes extending in a tube longitudinal direction in which refrigerant flows, and a pair of first and second tanks connected to longitudinal ends of the tubes at two end sides in the tube longitudinal direction to communicate with the tubes; a cold storage material tank which accommodates at least the tubes of the cold storage heat exchanger; and a cold storage material sealed in the cold storage material tank. The cold storage material is cold-stored by the refrigerant or is cold-released to cool gas refrigerant evaporated in the evaporator. In this cold storage tank unit, the second tank has a lower end portion that is positioned lower than a lower end portion of the first tank, and the second tank has a tank capacity capable of storing a predetermined liquid refrigerant condensed by cold storage heat of the cold storage material.

Accordingly, by suitably selecting the cold storage material and the refrigerant, refrigerant can be suitably cooled and condensed by cold released from the cold storage material, and the condensed refrigerant can be stored in the lower end portion of the second tank. Furthermore, by suitably setting the number and the length of the tubes and the sealed amount of the cold storage material, cold storage tank unit that can obtain desired heat transfer performance relating to cold storage and cold release. In addition, because refrigerant flows in the tubes of the cold storage heat exchanger and atmosphere pressure is applied to the cold storage material tank sealed with the cold storage material, the thickness of the cold storage material tank can be made thin or a low-strength material can be used for the cold storage material tank. Furthermore, the cold storage material tank can be formed into any suitable shape.

For example, the cold storage heat exchanger includes a first partition member which partitions an inner space of the first tank into a first space and a second space, an inflow portion, communicating with the first space, for introducing refrigerant into the first space, and an outflow portion, communicating with the second space, for flowing out refrigerant. Furthermore, the first partition member may be provided with an opening portion having a predetermined open area through which the first space and the second space communicate with each other. Alternatively, the plurality of tubes may include one tube communicating with the second space of the first tank. In this case, the one tube has a passage sectional area approximately corresponding to a refrigerant pipe connected to the evaporator. Furthermore, the one tube may extend into the second tank, and may communicate with an inside of the second tank at a position close to the lower end portion of the second tank.

The cold storage heat exchanger may further include a second partition member which partitions an inner space of the second tank into a first space communicating with the tubes other than the one tube and a second space communicating with the one tube. In this case, the second partition member may have an opening portion at a bottom side, and the one tube may extend to a portion adjacent to the lower end portion of the second tank.

For example, the cold storage material tank is a one-end opened container opened at a side of the first tank. In this case, all the cold storage heat exchanger may be approximately accommodated in the one-end opened container, and the cold storage heat exchanger may include a seal member through which an outer peripheral surface of the first tank is air-tightly connected to an inner peripheral surface of the cold storage material tank. Alternatively, the cold storage material tank is a container enclosing all of the cold storage heat exchanger, and has an inlet portion at a position corresponding to the inflow portion and an outlet portion at a position corresponding to the outflow portion. In this case, the cold storage tank unit may include a seal member interposed between the inflow portion of the cold storage heat exchanger and the inlet portion of the cold storage material tank, and interposed between the outflow portion of the cold storage heat exchanger and the outlet portion of the cold storage material tank. Furthermore, the cold storage heat exchanger may include a plurality of fins located to thermally contact the tubes.

The cold storage tank unit may be provided with a first connection portion through which the second tank communicates with an exterior part, and a second connection portion extending from the exterior part to the second tank. In this case, the plurality of tubes are constructed of a first tube group communicating with the first space of the first tank, and a second tube group communicating with the second space of the first tank. Furthermore, the second connection portion can communicate with the second tube group, and a check valve may be located in the second tank to allow one refrigerant flow from the second tank to the second tube group.

The second tank may be provided with an upper tank part having a specification approximately equal to the first tank, and a lower tank part located at a lower side of the upper tank part in the second tank to directly communicate with the upper tank part. Furthermore, the lower tank part in the second tank may be formed into approximately a cylindrical shape.

Furthermore, the cold storage tank unit may be located between the evaporator and a compressor in a refrigerant cycle apparatus such that refrigerant from the evaporator flows in the cold storage heat exchanger.

According to another aspect of the present invention, a refrigeration cycle apparatus for a vehicle, includes: a compressor for compressing refrigerant; a condenser for cooling and condensing the refrigerant from the compressor; a pressure reducing unit for decompressing refrigerant from the condenser; an evaporator for evaporating refrigerant from the pressure reducing unit, the evaporator being located in an air conditioning case for defining an air passage through which air flows into a vehicle compartment; and a cold storage heat exchanger located between the evaporator and the compressor and having a refrigerant passage through which refrigerant flows. In the refrigeration cycle apparatus, the cold storage heat exchanger is arranged outside the air conditioning case, the cold storage material stores cold by refrigerant flowing through the refrigerant passage in the cold storage heat exchanger when the compressor operates, and the cold storage material releases cold to refrigerant when the compressor stops.

Accordingly, when refrigerant circulates by the operation of the compressor, refrigerant absorbs heat in the evaporator from air to cool air, and cold storage material stores cold by low temperature refrigerant flowing from the evaporator. In contrast, when the compressor is stopped, refrigerant evaporated in the evaporator by absorbing heat from air is cooled and condensed by cold from the cold storage material of the cold storage heat exchanger. Accordingly, even when the compressor is stopped, while the cold stored in the cold storage material is held, the refrigerant can continuously flow into the evaporator by the remaining pressure between the condenser and the evaporator and can continuously cool air by the evaporator. In this regard, the heat transfer performance relating to cold storage and cold release as the above-mentioned cold storage tank unit is secured by the settings of the number and length of the refrigerant tubes and the amount of cold storage material filled in the cold storage material tank.

For example, a tank for storing liquid refrigerant condensed when the cold storage material releases cold, may be located between the cold storage heat exchanger and the compressor. Furthermore, the tank may be provided at least at a lower side of the cold storage heat exchanger. Alternatively, the cold storage heat exchanger may be located within the tank to define an upper space and a lower space in the tank by the cold storage heat exchanger. In this case, the apparatus includes a pipe connecting to the compressor. Here, the pipe is connected to the tank and has an opening portion open to the upper space of the tank. Furthermore, the pipe may have a liquid refrigerant introduction portion open to the lower space in the tank, for introducing liquid refrigerant, or the cold storage heat exchanger and the tank may be an integrated unit.

In the refrigeration cycle apparatus, an internal heat exchanger may be located to perform heat exchange between refrigerant between the cold storage heat exchanger and the compressor, and refrigerant between condenser and the pressure reducing unit, or may be located to perform heat exchange between refrigerant between the tank and the compressor, and refrigerant between condenser and pressure reducing unit. For example, the internal heat exchanger may be a double type pipe.

BRIEF DESCRIPTION OF THE DRAWINGS

Additional objects and advantages of the present invention will be more readily apparent from the following detailed description of preferred embodiments when taken together with the accompanying drawings.

FIG. 25 is a schematic diagram showing the general construction of a refrigeration cycle apparatus in a twelfth embodiment.

FIGS. 26A to 26C are perspective views showing cold storage heat exchangers (cold storage capsules) in the other embodiments.

DETAILED DESCRIPTION OF THE PREFERRED EMBODIMENTS

First Embodiment

Figure 1:
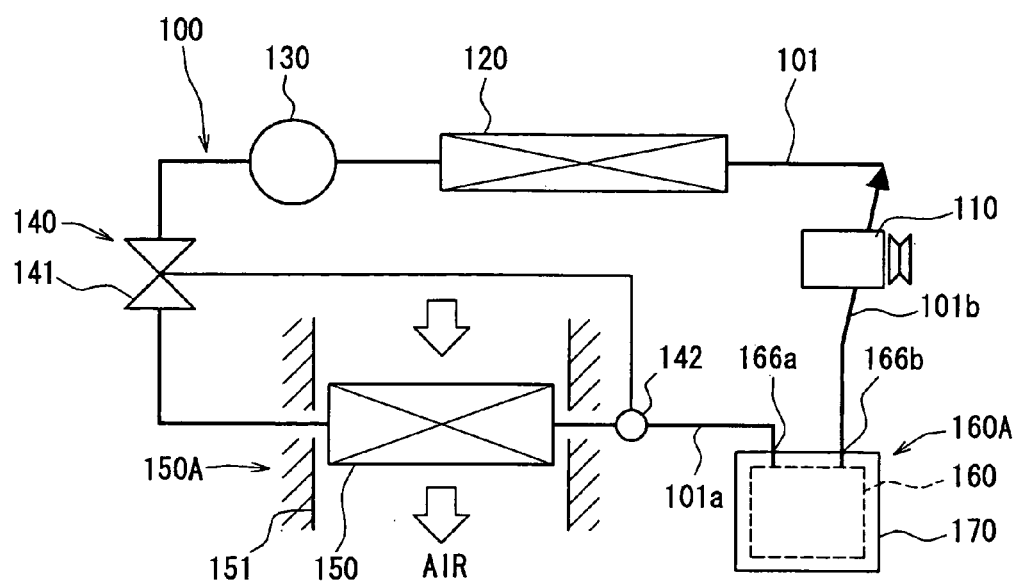
FIG. 1 is a schematic diagram showing the general construction of a refrigeration cycle apparatus in a first embodiment.
Figure 2:
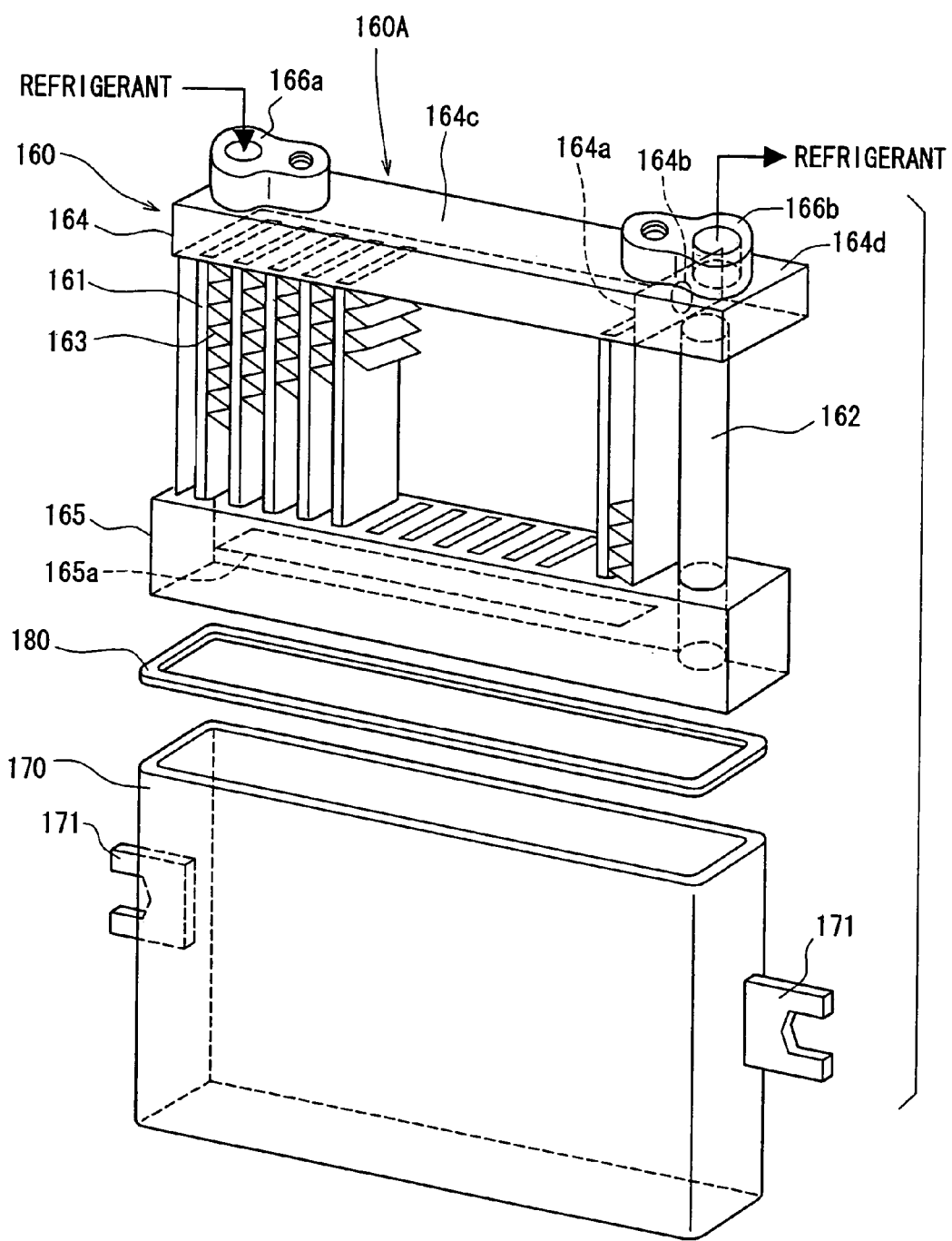
FIG. 2 is an exploded perspective view showing a cold storage tank unit in the first embodiment.
Figure 3:
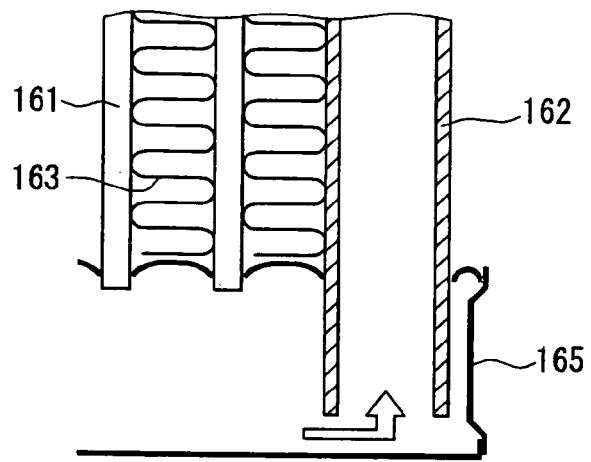
FIG. 3 is a cross-sectional view showing a return pipe and a lower tank of a cold storage heat exchanger in the first embodiment.

A refrigeration cycle apparatus 100 of a first embodiment is typically applied to a so-called idling stop vehicle in which an engine is stopped when the vehicle is shifted from a running state to a stopping state where the engine is idled, for example, when the vehicle waits at a traffic signal. The basic construction of the refrigeration cycle apparatus 100 will be described by the use of FIG. 1 to FIG. 3. Here, FIG. 1 is a schematic diagram showing the general construction of the refrigeration cycle apparatus 100. FIG. 2 is an exploded view in perspective showing a cold storage tank unit 160A. FIG. 3 is a cross-sectional view showing a return pipe 162 and a lower tank 165 of a cold storage heat exchanger 160.

The refrigeration cycle apparatus 100 transfers heat on a low temperature side to a high temperature side to use cold and heat for air conditioning. As shown in FIG. 1, the refrigeration cycle apparatus 100 is constructed with a cycle in which a usual compressor 110, a condenser 120 (radiator), a liquid receiver tank 130, a temperature type expansion valve 140 (thermal expansion valve), and an evaporator 150 are connected in series in the shape of a ring by piping 101, and a cold storage tank unit 160A which is added to the cycle.

The compressor 110 is a fluid machine that is operated by a driving source of an engine (not shown) of a vehicle to compress refrigerant (for example, HFC134a) in the refrigeration cycle apparatus 100 to a high-temperature and high-pressure state, and to discharge the refrigerant. The condenser 120 is a heat exchanger that is arranged on a refrigerant discharge side of the compressor 110 and cools the refrigerant compressed to the high-temperature and high-pressure state to thereby condense and liquefy the refrigerant. The liquid receiver tank 130 is a receiver that separates the refrigerant condensed by the condenser 120 into vapor-phase refrigerant and liquid-phase refrigerant and flows out the liquid-phase refrigerant.

The temperature type expansion valve (corresponding to a pressure reducing unit and hereinafter referred to as "expansion valve") 140 reduces the pressure of the liquid-phase refrigerant separated by the liquid receiver tank 130 to expand the liquid-phase refrigerant in an isenthalpic manner and includes a valve part 141 and a temperature sensing part 142 arranged on the refrigerant outflow side of the evaporator 150. That is, the temperature sensing part 142 is positioned between the evaporator 150 and the cold storage tank unit 160A. In the expansion valve 140, the throttle opening of the valve part 141 is controlled according to a refrigerant temperature sensed by the temperature sensing part 142 to bring the degree of superheat of the refrigerant flowing out of the evaporator 150 to a specified value (for example, from 5° C. to 10° C.).

The evaporator 150 is a heat exchanger that evaporates the refrigerant having pressure reduced by the expansion valve 140 to develop the action of absorbing heat and is arranged in an air-conditioning case 151 and cools (absorbs heat from) air-conditioning air supplied into this air-conditioning case 151. In addition, a blower for blowing air-conditioning air, a heat exchanger for heating air-conditioning air, and an air mixing door mechanism for adjusting the mixing ratio between cooling air and heating air, which are not shown in the drawing, are arranged in the air-conditioning case 151 and form an interior unit 150A. This interior unit 150A is arranged in an instrument panel in a vehicle compartment.

The cold storage tank unit 160A is located between the evaporator 150 and the compressor 110 in such a way as to be in series with the evaporator 150. In the cold storage tank unit 160A, as shown in FIG. 2 and FIG. 3, a cold storage material tank 170 has a cold storage material filled therein and has a cold storage heat exchanger 160 arranged therein and a packing 180 as a sealing member is located between these cold storage heat exchanger 160 and cold storage material tank 170.

The cold storage heat exchanger 160 is a heat exchanger that causes refrigerant flowing out of the evaporator 150 to be introduced, and exchanges heat between this refrigerant and the cold storage material in the cold storage material tank 170. Specifically, the cold storage heat exchanger 160 is a multi-flow type heat exchanger and is formed of a pair of tanks 164, 165 connected to both end portions in the direction of length of multiple refrigerant tubes 161 layered (arranged) in a line. The refrigerant tubes 161 are used in such a way that the direction of length is nearly in a vertical direction. Moreover, the pair of tanks 164, 165 are used in such a way that the direction of length is nearly in a horizontal direction. The pair of tanks 164, 165 are an upper tank 164 and a lower tank 165 which are arranged at an upper position and a lower position, respectively.

Here, the respective parts (which will be described below in detail) forming the cold storage heat exchanger 160 are made of aluminum or aluminum alloy and are integrally brazed by a brazing material put on portions abutting on each other.

The refrigerant tube 161 is formed by extrusion processing and is formed in a flat cross section perpendicular to the direction of length and has its internal passage partitioned into multiple portions by multiple partition walls connecting the long sides of the flat cross section shape. Multiple refrigerant tubes 161 are arranged (layered) in the left and right direction in FIG. 2. Corrugated fins 163, each of which is formed in a wavy shape by rolling processing from a strip thinner than the refrigerant tube 161 and is formed into multiple louvers in its plane portion, are located between (thermally joined by brazing to) the refrigerant tubes 161. A heat exchange part is constructed with the refrigerant tubes 161 and the fins 163.

Each of the upper tank 164 and the lower tank 165 is a slender rectangular container formed by bending a flat plate or by joining flat plates. In the tanks 164, 165, tube holes are formed at positions corresponding to the refrigerant tubes 161 and both ends in the direction of length of the respective refrigerant tubes 161 are inserted into the tube holes and are joined to the tanks 164, 165, whereby the both tanks 164, 165 communicate with the respective refrigerant tubes 161.

A return pipe 162 is arranged in one outside portion (right side in FIG. 2) in the direction in which the refrigerant tubes 161 are layered, and communicates with the upper tank 164 and the lower tank 165. The return pipe 162 is set as a cylindrical large pipe and the cross-sectional area of its passage corresponds to the cross-sectional area of piping (inflow pipe 101a and outflow pipe 101b which are described later) connected between the evaporator 150 and the compressor 110 of the piping 101 of the refrigeration cycle apparatus 100.

The lower end portion of the return pipe 162, as shown in FIG. 3, extends close to the bottom surface of the lower tank 165 and the return pipe 162 communicates with the lower tank 165 at a portion close to its lower end. The return pipe 162 may be replaced by multiple refrigerant tubes 161 extending close to the bottom surface of the lower tank 165.

In the upper tank 164, a separator 164a as a partition part is fixed at a position between the multiple refrigerant tubes 161 and the return pipe 162. The inside of the upper tank 164 is partitioned into a first space 164c on the refrigerant tube 161 side and a second space 164d on the return pipe 162 side. A circular opening 164b having a specified opening area is formed in the central portion of the separator 164a and a specified amount of at least a part of refrigerant (vapor-phase refrigerant) flowing into the first space 164c can directly flow into the second space 164c.

An inlet joint 166a (inflow part) communicating with the first space 164c is connected to one end in the direction of length of the upper tank 164. An outlet joint (outflow part) 166b communicating with the second space 164d is connected to another end in the direction of length of the upper tank 164.

In order to provide the lower tank 165 with the function of collecting the refrigerant and of storing the refrigerant, the lower tank 165 is set so as to have a larger size in the vertical direction and a larger inner capacity than the upper tank 164. As will be described later, when superheated gas refrigerant flowing into the cold storage heat exchanger 160 is cooled by the cold storage material, the gas refrigerant is condensed and brought into liquid refrigerant. This inner capacity is made large enough to store a specified amount of liquid refrigerant.

The capacity of the lower tank 165 is set so as to provide air cooling for a predetermined time while the compressor 110 is stopped. For example, the capacity is set so as to provide comparatively weak air cooling for a short time while the compressor 110 is stopped. For example, in the idle stop vehicle, the capacity can be set at a capacity capable of keeping comparatively weak air cooling of a level that can inhibit the deterioration of comfort of occupants during idle stop or can make occupants (passengers) sense the continuation of air cooling or a capacity larger than this capacity. Hence, this capacity is set according to the use of the refrigeration cycle apparatus to which the cold storage tank unit is applied. There are cases where the capacity of this lower tank 165 is set so as to store the amount of refrigerant to be liquefied by the cold storage material according to the cold storage capacity of the cold storage material. There are cases where the capacity of this lower tank 165 is set more than a capacity required to flow refrigerant while the compressor 110 is operated.

The lower tank 165 is made large in the area of a side wall in the direction of length of the above-mentioned setting of the capacity and hence is easily deformed by the internal pressure of refrigerant. Hence, a reinforcing plate 165a for coupling opposed side walls in the direction of length is arranged in the horizontal direction. Here, multiple holes passing through in the vertical direction may be formed in the reinforcing plate 165a. Alternatively, the multiple reinforcing plates 165a each having an opening like the above-mentioned separator 164a may be arranged in the direction of length in the lower tank 165.

The cold storage material tank 170 is a flat half container having the mounting brackets 171 of parts, by which the cold storage material tank 170 is mounted on the vehicle, formed integrally and is formed of a thin resin material by injection molding. The container is nearly large enough to include the whole cold storage heat exchanger 160. The cold storage material tank 170 has a specified amount of cold storage material (for example, paraffin, ice) filled therein from its opening and has the cold storage heat exchanger 160 arranged therein.

A ring-shaped packing 180 as a sealing part is located between the side wall surface (outer peripheral surface) of the upper tank 164 and the inner wall surface (inner peripheral surface) on the opening side of the cold storage material tank 170 to prevent the cold storage material from leaking from the cold storage material tank 170. In this manner, the cold storage tank unit 160A is formed in which the cold storage material contacts the refrigerant tubes 161 and the fins 163 of the cold storage heat exchanger 160 in the cold storage material tank 170 to thereby cause heat to move in and out between the cold storage material and the refrigerant tubes 161 and fins 163 mainly by heat conduction.

The inflow piping 101a extending from the refrigerant outflow side of the evaporator 150 is connected to the inlet joint 166a of the cold storage tank unit 160A and the outflow piping 101b connected to the suction side of the compressor 110 is connected to the outlet joint 166b of the cold storage tank unit 160A.

Next, the operation and effect of the refrigeration cycle apparatus 100 based on the above-mentioned construction will be described.

1. Cold Storage Mode

When the vehicle runs, the compressor 110 is driven by the engine to operate the refrigeration cycle apparatus 100. The refrigerant compressed by and discharged from the compressor 110 is condensed and liquefied by the condenser 120 and passes through the liquid receiver tank 130 and is reduced in pressure by the expansion valve 140. Then, the refrigerant absorbs heat from air-conditioning air and evaporates in the evaporator 150 to thereby cool the air-conditioning air (performs air conditioning).

The refrigerant flowing out of the evaporator 150 passes through the inflow piping 101a and flows into the cold storage tank unit 160A. Specifically, the refrigerant passes through the inlet joint 166a of the cold storage heat exchanger 160, the first space 164c of the upper tank 164, and the refrigerant tubes 161. The cold storage material is changed from a liquid phase to a solid phase by the refrigerant having temperature lower than the melting point of the cold storage material to thereby store the latent heat of solidification. That is, the refrigerant cools the cold storage material in the cold storage material tank 170 to store cold.

The refrigerant absorbing heat from the air-conditioning air and the cold storage material in the evaporator 150 and the cold storage heat exchanger 160 (refrigerant tubes 161) becomes superheated gas refrigerant and flows into the lower tank 165 and passes through the bottom end of the return pipe 162, the second space 164d of the upper tank 164, the outlet joint 166b, the outflow piping 101b and then returns to the compressor 110. Here, thermal load in the vehicle compartment and the thermal load of cooling this cold storage material become the total cooling load of the refrigeration cycle apparatus 100. When cold storage by the cold storage material is finished, heat transfer between the refrigerant and the cold storage material in the cold storage tank unit 160A is stopped.

2. Cold Release Mode

When the vehicle is stopped and the engine is stopped, the compressor 110 is also stopped. At this time, in the refrigeration cycle apparatus 100, the refrigerant is flowed by its remaining pressure from the condenser 120 and the liquid receiver tank 130, which are on the high pressure side, into the evaporator 150 and the cold storage tank unit 160A, which are on the low-pressure side, through the expansion valve 140.

The refrigerant flowing into the evaporator 150 exchanges heat with the air-conditioning air to cool air-conditioning air, thereby being brought into superheated gas refrigerant having temperature higher than the melting point of the cold storage material. The superheated gas refrigerant flows into the cold storage tank unit 160A from the inflow piping 101a to give the cold storage material with the latent heat of melting, thereby being cooled. In other words, the superheated gas refrigerant is cooled by the cold stored in the cold storage material, thereby being condensed and liquefied and stored as liquid refrigerant in the lower tank 165 by gravity.

That is, the superheated gas refrigerant from the evaporator 150 is condensed and is reduced in volume by the refrigerant tubes 161 of the cold storage heat exchanger 160 and is stored as liquid refrigerant in the lower tank 165 to keep its pressure at low pressure. Hence, even when the compressor 110 is stopped, while the cold stored in the cold storage material is held, the refrigerant can continuously flow into the evaporator 150 by the remaining pressure between the condenser 120 and the evaporator 150 and can continuously cool the air-conditioning air by the evaporator 150. In this regard, the heat transfer performance relating to cold storage and cold release as the above-mentioned cold storage tank unit 160A is secured by the settings of the number and length of the refrigerant tubes 161 and the amount of cold storage material filled in the cold storage material tank 170.

Here, in this embodiment, the cold storage material tank 170 is arranged on the outside of the cold storage heat exchanger 160 through which the refrigerant flows and the cold storage material tank 170 is filled with the cold storage material. Hence, it is possible to apply the pressure of the refrigerant to the inside of the cold storage heat exchanger 160 and to apply not the pressure of the refrigerant but only the atmospheric pressure to the cold storage material tank 170. Hence, it is possible to make the cold storage material tank 170 of a thin plate or to use material of low strength and hence to reduce the size and cost of the cold storage material tank 170. The cold storage material tank 170 does not need to have resistance to pressure and hence can be formed in a flat rectangular shape having a wide plane like this embodiment in place of a spherical or cylindrical shape, which can improve the ease with which the cold storage material tank 170 can be mounted in the engine room of the vehicle.

Moreover, because the pair of tanks 164 and 165 of the cold storage heat exchanger 160 are formed as the upper tank 164 and the lower tank 165, the liquid refrigerant condensed by the cold storage material flows down into the lower tank by the gravity. Hence, this can prevent the liquid refrigerant from staying in the refrigerant tubes 161 of the cold storage heat exchanger 160, and can exchange heat between the refrigerant in the cold storage heat exchanger 160 and the cold storage material in the cold storage material tank 170 with high efficiency. That is, the condensed liquid refrigerant does not remain as thick films on the inner wall surfaces of the refrigerant tubes 161, which results in securing heat transfer surfaces of the refrigerant tubes 161, through which heat is transferred to the cold storage material, to a sufficient extent and hence in exchanging heat between them with high efficiency.

Moreover, because the upper tank 164 is partitioned into the first space 164c and the second space 164d, and the first space 164c and the second space 165d are respectively provided with the inlet joint 166a and the outlet joint 166b, the piping 101a and 101b can be put together on the upper tank 164 side, which results in improving the ease with which the piping 101a and 101b can be arranged.

Furthermore, because the separator 164a arranged in the upper tank 164 has the opening 164b, a portion of refrigerant flowing in from the inlet joint 166a can made to directly flow out of the outlet joint 166b through the opening 164b. That is, when the vehicle is brought to the running state after the above-mentioned cold release mode, the engine is started and the compressor 110 is also operated. The compressor 110 absorbs the refrigerant from the cold storage tank unit 160A. At this time, the compressor 110 absorbs mainly the liquid refrigerant condensed in the lower tank 165 by the cold storage material in the cold release mode and hence compresses liquid refrigerant. However, a portion of superheated gas refrigerant evaporated by the evaporator 150 can be passed through the inlet joint 166a and the opening 164b, can be made to flow into the outlet joint 166b, and can be absorbed by the compressor 110. With this, the degree of compression of the liquid refrigerant can be reduced.

Still further, the lower tank 165 is made to communicate with the second space 164d of the upper tank 164 by the return pipe 162 in place of the refrigerant tubes 161. Hence, this can reduce the resistance of the refrigerant flowing from the lower tank 165 to the second space 164d.

Still further, the return pipe 162 communicates with the lower tank 165 at a position close to the bottom end thereof. Hence, when the refrigerant flows through the cold storage heat exchanger 160, the liquid refrigerant of the superheated gas refrigerant and the liquid refrigerant flowing into the lower tank 165 can be preferentially made to flow through the return pipe 162 and the second space 164d and to flow out of the outlet joint 166b, which can prevent the liquid refrigerant from being stored in the lower tank 165. That is, when the refrigerant is circulated in the refrigeration cycle by the compressor 110 in the cold storage mode, the liquid refrigerant is prevented from being stored in the lower tank 165 to prepare the cold release mode. When the compressor 110 is stopped in the cold release mode, the superheated gas refrigerant flowing out of the evaporator 150 can be condensed by the cold storage material and can be stored in the lower tank 165.

Still further, the cold storage material tank 170 is made of a half container, and has the cold storage material and the cold heat exchanger 160 arranged therein, and then both of the cold storage material tank 170 and the cold heat exchanger 160 are sealed by the packing 180. Hence, the cold storage material can be prevented from leaking from the cold storage material tank 170 by simple construction. In short, it is possible to eliminate the need for refilling the cold storage material periodically.

Still further, the fins are located between and brazed to the multiple refrigerant tubes 161. Hence, this can increase the heat transfer area of the cold storage material and can improve heat exchange performance between the refrigerant and the cold storage material.

In this regard, as to the condenser 120, there is a case where a liquid receiver tank is integrally formed as a modulator tank in the condenser 120 of the type in which the refrigerant is cooled to a supercooling range (so-called sub-cool condenser). In this case, the liquid receiver tank 130 may be omitted.

Still further, in the refrigeration cycle apparatus 100 of the present embodiment, as the amount of refrigerant on the high pressure side is larger, a longer cold release time can be secured. Hence, in the case where the time during which the compressor 110 can be stopped needs to be kept longer than a specified time, it is also recommendable to arrange this additional liquid receiver tank 130 or to enlarge the capacity of the liquid receiver tank 130 or the diameter of high-pressure piping.

Second Embodiment

Figure 4:
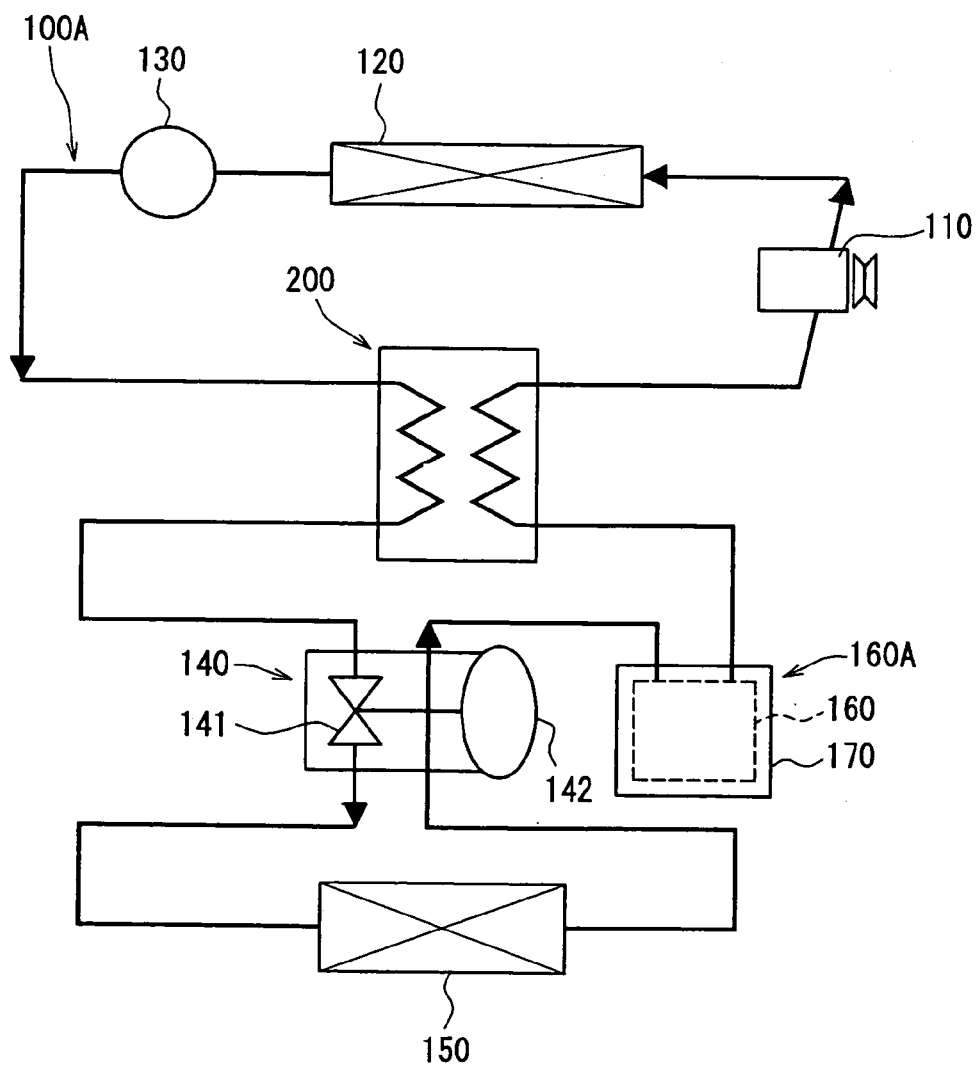
FIG. 4 is a schematic diagram showing the general construction of a refrigeration cycle apparatus in a second embodiment.

A second embodiment of the present invention will be shown in FIG. 4. The second embodiment is such that, as compared with the first embodiment, an internal heat exchanger 200 is added to a refrigeration cycle apparatus 100A.

The internal heat exchanger 200 exchanges heat between high-pressure side refrigerant between the condenser 120 and the expansion valve 140 (specifically, the liquid receiver tank 130 and the expansion valve 140) and low-pressure side refrigerant between the cold storage tank unit 160A and the compressor 110. The internal heat exchanger 200 is formed as a heat exchanger of, for example, a double pipe structure in which a low-pressure side pipe, through which the above-mentioned low-pressure side refrigerant flows, is arranged in a specified range (specified length) of a high-pressure side pipe, through which the above-mentioned high-pressure side refrigerant flows. That is, the high-pressure side refrigerant flows between the high-pressure side pipe and the low-pressure side pipe to thereby exchange heat with the low-pressure side refrigerant flowing through the low-pressure side pipe. The high-pressure side refrigerant is supercooled by the low-pressure side refrigerant and the low-pressure side refrigerant is superheated by the high-pressure side refrigerant.

Moreover, the refrigerant before flowing into the compressor 110 is superheated by the internal heat exchanger 200 as described above, so that the refrigerant flowing out of the evaporator 150 is not superheated, and is decreased in the degree of superheat as much as possible. Specifically, the setting of the expansion valve 140 is adjusted, that is, the setting of throttle opening is more increased with respect to a refrigerant temperature at the temperature sensing part 142, so as to bring the degree of superheat to within a range from 0° C. to 3° C.

In the second embodiment constructed in this manner, the same cold storage mode and cold release mode as in the first embodiment are performed by the cold storage tank unit 160A to thereby continue a refrigeration function when the compressor 110 is stopped.

Moreover, because the low-pressure side refrigerant can be superheated by the internal heat exchanger 200, the refrigerant flowing out of the evaporator 150 is not superheated by the setting of the expansion valve 140. Hence, the temperature of refrigerant flowing into the cold storage tank unit 160A is decreased without decreasing the pressure of the refrigerant in the evaporator 150, in other words, without reducing the coefficient of performance (COP) of a refrigerator as the refrigeration cycle apparatus 100A, whereby cold can be surely stored in the cold storage material.

Furthermore, the addition of the internal heat exchanger 200 can increase the degree of supercooling of the refrigerant flowing from the condenser 120 into the evaporator 150 and can increase the amount of liquid-phase refrigerant flowing out of the condenser 120 to thereby supply the evaporator 150 with the increased amount of liquid-phase refrigerant. Hence, in the evaporator 150, as the amount of liquid-phase refrigerant increases, the resistance to flow of the refrigerant is decreased and the cooling performance of air-conditioning air can be improved. Furthermore, the degree of superheat in the evaporator 150 can be set at a small value and hence the temperature of the refrigerant is decreased to increase the temperature difference between the refrigerant and the air-conditioning air to thereby improve the cooling performance of the air-conditioning air. The refrigerant flowing out of the cold storage tank unit 160A is superheated by the internal heat exchanger 200, thereby being surely brought to vapor-phase refrigerant. Hence, it is possible to prevent liquid compression in the compressor 110.

In this regard, the degree of superheat in the evaporator 150 is within a range, for example, from 0° C. to 3° C. in the above description. However, when a specified degree of superheat is realized (vapor-phase refrigerant is produced) in the internal heat exchanger 200, it is also recommended that the refrigerant never has the degree of superheat in the evaporator 150, that is, the degree of superheat is made not higher than 0° C. to thereby bring the refrigerant into the state of two phases of a vapor phase and a liquid phase.

Furthermore, the internal heat exchanger 200 is not limited to a heat exchanger of a double-pipe structure, but it is also recommendable to employ a heat exchanger of the structure in which two passages are arranged in parallel and in which heat is exchanged between high-pressure side refrigerant flowing through one passage of the two passages and low-pressure side refrigerant flowing through another passage thereof.

Third Embodiment

Figure 5:
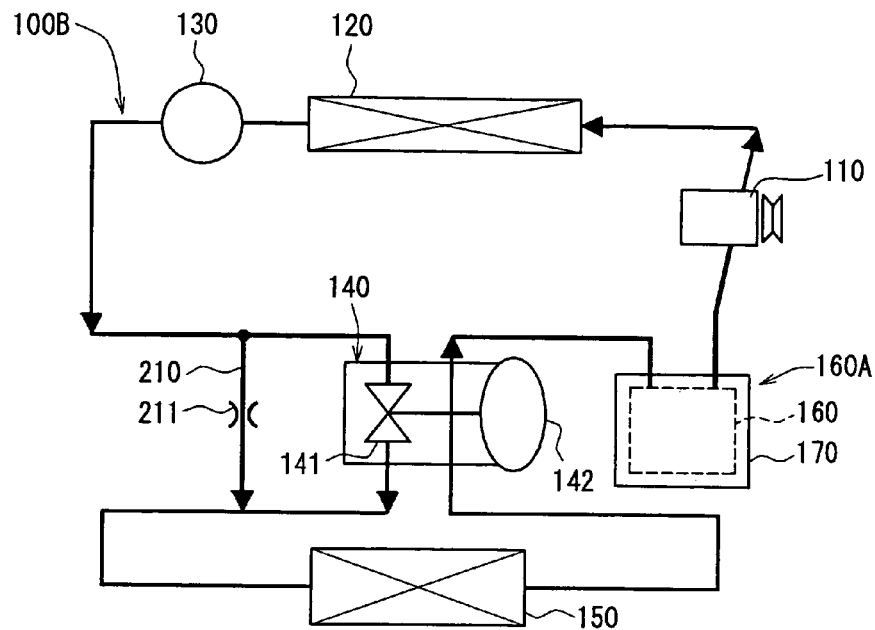
FIG. 5 is a schematic diagram showing the general construction of a refrigeration cycle apparatus in a third embodiment.

A third embodiment of the present invention is shown in FIG. 5. The third embodiment is such that, as compared with the first embodiment, a fixed throttle part 191 is arranged in parallel to the expansion valve 140 in a refrigeration cycle apparatus 100B.

Specifically, there is provided a bypass passage 210 bypassing the valve part 141 of the expansion valve 140 and this bypass passage 210 is provided with the fixed throttle part 211 having its opening fixed to a specified opening.

In the cold storage mode while the compressor 110 is operated, the expansion valve 140 opens the valve part 141 to a specified opening according to the refrigerant temperature (degree of superheat of refrigerant) of the temperature sensing part 142. However, in the cold release mode, there is a case where the compressor 110 is stopped to increase the low-pressure side pressure whereas the valve part 141 is gradually closed because the temperature sensing part 142 is cooled.

In this manner, an air cooling capacity in the cold release mode is limited by the opening of the expansion valve 140 at this time. However, because this third embodiment is provided with the fixed throttle part 211, the refrigerant flowing out of the condenser 120 can be made to flow into the evaporator 150 through the fixed throttle part 211 irrespective of the variable throttle opening of the expansion valve 140. Hence, the air cooling capacity when the compressor 110 is stopped can be secured.

Fourth Embodiment

Figure 6:
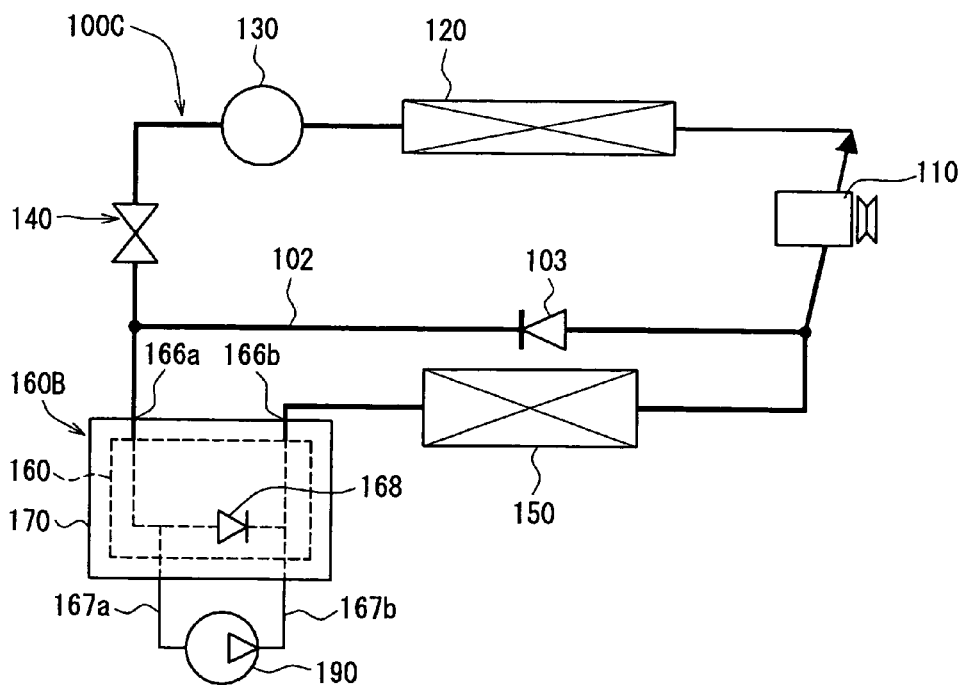
FIG. 6 is a schematic diagram showing the general construction of a refrigeration cycle apparatus in a fourth embodiment.
Figure 7:
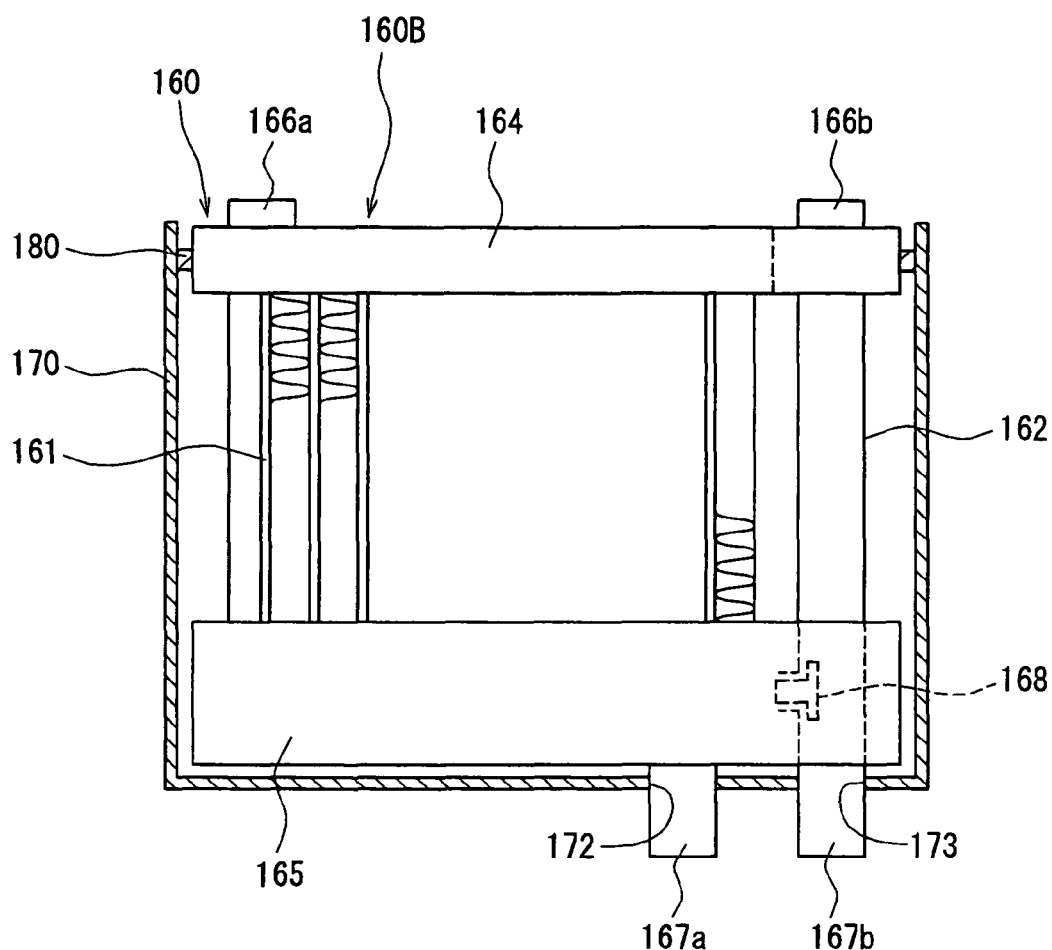
FIG. 7 is a cross-sectional view showing a cold storage tank unit in the fourth embodiment.

A fourth embodiment of the present invention is shown in FIG. 6 and FIG. 7. The fourth embodiment is such that, as compared with the first embodiment, the structure of flow of refrigerant of a cold storage tank unit 160B is changed in a refrigeration cycle apparatus 100C, and that a liquid refrigerant circulation pump (hereinafter referred to as "pump") 190 is provided as pump means to circulate refrigerant between the evaporator 150 and the cold storage tank unit 160B in the cold release mode to continuously cool air-conditioning air by the evaporator 150.

In the cold storage tank unit 160B, as shown in FIG. 7, the cold storage material tank 170 has openings 172, 173 formed in the bottom surface. The cold storage tank unit 160B is provided with an outside connection passage 167a passing through the opening 172 and connecting the inside of the lower tank 165 and the outside of the cold storage material tank 170. The outside connection passage 167a and the opening 172 are sealed by a sealing material (not shown) to prevent cold storage material from leaking outside.

Moreover, the cold storage tank unit 160B is provided with a connection passage 167b passing through the opening 173 and connecting the outside of the cold storage material tank 170 and the return pipe 162 in the lower tank 165. The connection passage 167b and the opening 173 are sealed by a sealing material (not shown) to prevent the cold storage material from leaking outside.

A check valve 168 is arranged in the side wall of the return pipe 162 in the lower tank 165. The check valve 168 is a valve allowing the refrigerant to flow only in one direction, that is, from the lower tank 165 to the return pipe 162.

The cold storage tank unit 160B, as shown in FIG. 6, is located between the expansion valve 140 and the evaporator 150. That is, the inlet joint 166a is connected to the refrigerant outflow side of the expansion valve 140 and the outlet joint 166b is connected to the refrigerant inflow side of the evaporator 150. Further, the pump 190 is located between the outside connection passage 167a, and the connection passage 167b and the refrigerant is pressure sent from the outside connection passage 167a to the connection passage 167b.

Moreover, a refrigerant passage 102 connecting the refrigerant outflow side of the evaporator 150 and the refrigerant inflow side of the cold storage tank unit 160B (between the expansion valve 140 and the inlet joint 166a) is formed. This refrigerant passage 102 is provided with a check valve 103 allowing the refrigerant to flow only in one direction, that is, from the evaporator 150 to the cold storage tank unit 160B.

In the refrigeration cycle apparatus 100C of this embodiment, when the refrigerant is circulated in the refrigeration cycle by the operation of the compressor 110 in the cold storage mode, the refrigerant having pressure reduced by the pressure reducing part 140 and having low temperature opens and flows through the check valve 168 in the cold storage tank unit 160B, while the cold storage material in the cold storage tank unit 160B is cooled by the low-temperature refrigerant. The refrigerant flowing out of the cold storage tank unit 160B absorbs heat from the air-conditioning air in the evaporator 150 to cool the air-conditioning air.

In contrast, in the cold release mode, when the compressor 110 is stopped, the pump 190 is operated to circulate the refrigerant from the connection passage 167b of the cold storage tank unit 160B through the return pipe 162, the outlet joint 166b, the evaporator 150, the refrigerant passage 102, the check valve 103, the inlet joint 166a of the cold storage tank unit 160B, the upper tank 164, the tubes 161, the lower tank 165, and the outside connection passage 167a to the pump 190, in this order. Hence, the refrigerant that absorbs heat from the air-conditioning air in the evaporator 150 and is evaporated flows into the cold storage tank unit 160B and is condensed and liquefied by cold release from the cold storage material and is stored as liquid refrigerant in the lower tank 165. Then, the liquid refrigerant is again sent to the evaporator 150 to repeat this cycle, so that the air-conditioning air can be continuously cooled by the evaporator 150.

Fifth Embodiment

Figure 8:
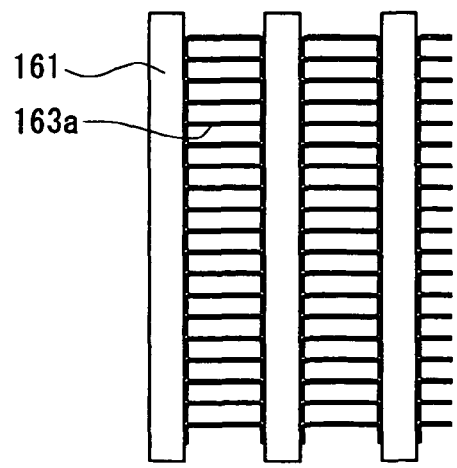
FIG. 8 is a front view showing fins of a cold storage heat exchanger in a fifth embodiment.
Figure 9:
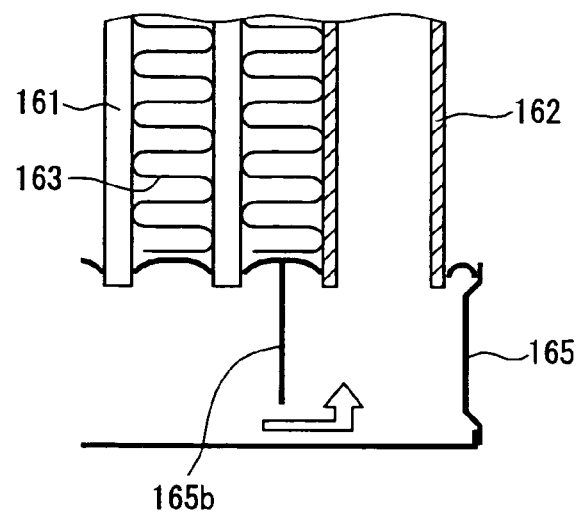
FIG. 9 is a cross-sectional view showing a return pipe and a lower tank of a cold storage heat exchanger in the fifth embodiment.

A fifth embodiment of the present invention is shown in FIG. 8 and FIG. 9. The fifth embodiment is such that, as compared with the first embodiment, the detailed structure of the cold storage heat exchanger 160 is modified.

The fin 163 forming the heat exchange part of the cold storage heat exchanger 160 may be plate type fin 163a as shown in FIG. 8 in place of the corrugated type fin of the first embodiment. The fin 163a is a thin strip and has multiple burring holes or cutouts for the refrigerant tubes 161 formed at positions of the refrigerant tubes 161 in the direction of length of the strip. Here, the fin 163a may have fine bumps and dips or louvers formed on the surface so as to improve the efficiency of heat exchange.

After the multiple fins 163a are layered, the refrigerant tubes 161 are passed through the burring holes or the cutouts for the respective tubes and then are expanded, whereby the fins 163 are pressure-fixed to the outer surfaces of the tubes 161. Furthermore, the fins 163a are brazed to the outer surfaces of the tubes 161. The plate type fin 163a can be formed by press processing and can be manufactured at low cost.

Moreover, the return pipe 162, as shown in FIG. 9, has its lower end bonded to the upper surface of the lower tank 165. The lower tank 165 is provided with the separator 165b as a partition wall for partitioning the inside of the lower tank 165 into a return pipe 162 side and its opposite side, and the lower side of the separator 165b is open. That is, the separator 165b extends from the upper surface of the lower tank 165 toward the lower surface, and a clearance is formed between the lower end of the separator 165b and the lower surface of the lower tank 165.

Hence, the return pipe 162 communicates with the lower end of the lower tank 165 via the separator 165b and performs the same function as the first embodiment.

Figure 10:
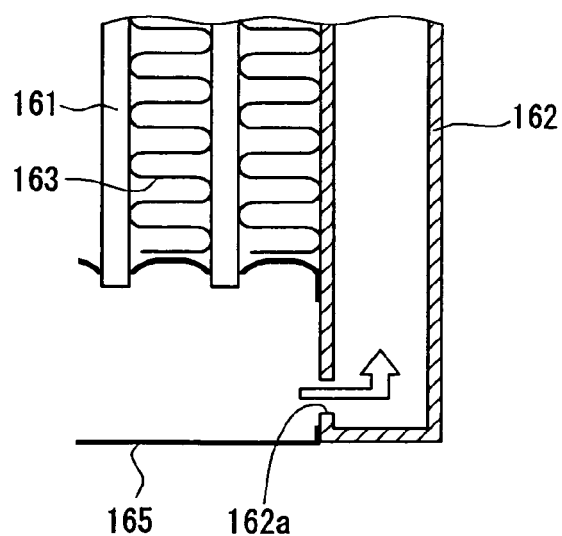
FIG. 10 is a cross-sectional view showing a return pipe and a lower tank of a cold storage heat exchanger in a modification of the fifth embodiment.

In this regard, as a modification of the fifth embodiment, the return pipe 162 may be formed in such a manner shown in FIG. 10 that an end portion in the direction of length is closed and that an inflow hole 162a is formed in a circumferential surface on the end portion to make the end portion in the direction of length of the lower tank 165 communicate with the inside of the lower tank 165.

Moreover, the packing 180 of the cold storage tank unit 160A has a structure in which the packing 180 is independent of the cold storage heat exchanger 160 and the cold storage material tank 170. However, the cold storage material tank 170 is made of, for example, a rubber-like material having elasticity and the packing 180 may be formed integrally with the cold storage material tank 170.

Furthermore, when there is no restriction for arranging the respective piping 101a, 101b with respect to the cold storage tank unit 160A, it is also recommendable to eliminate the return pipe 162 and the separator 164a and to fix the outlet joint 166b to the lower tank 165.

Still further, the opening 164b of the separator 164a may be eliminated according to the degree of effect of liquid compression on the compressor 110 when the cold release mode is shifted to the cold storage mode.

Sixth Embodiment

A sixth embodiment of the present invention is shown in FIG. 11 to FIG. 15. The sixth embodiment is such that, as compared with the first embodiment, the structures of the cold storage heat exchanger 160, the cold storage material tank 170, and the packing 180 are changed respectively to form a cold storage tank unit 160C.

Figure 11:
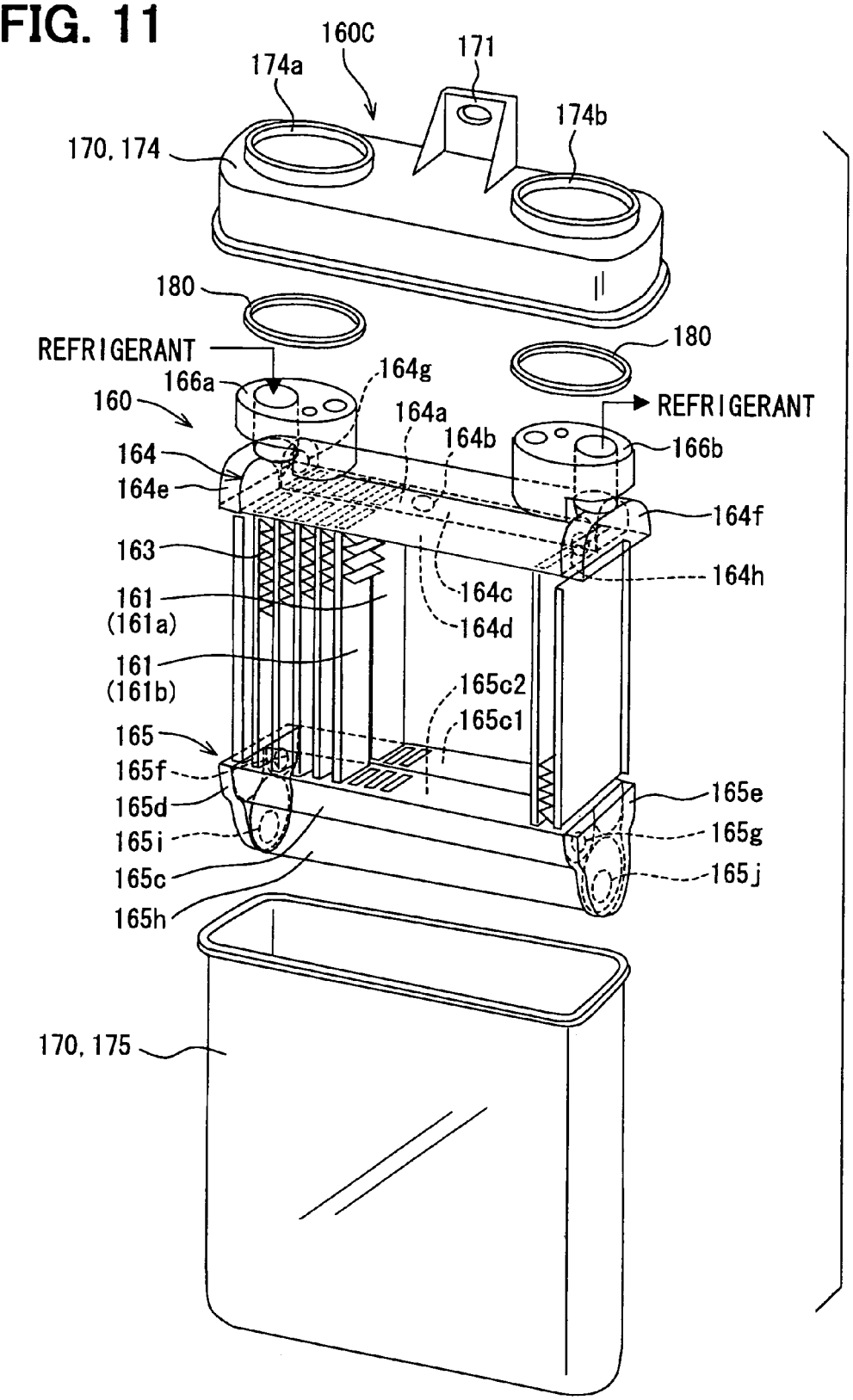
FIG. 11 is an exploded perspective view showing a cold storage tank unit in a sixth embodiment.
Figure 12:
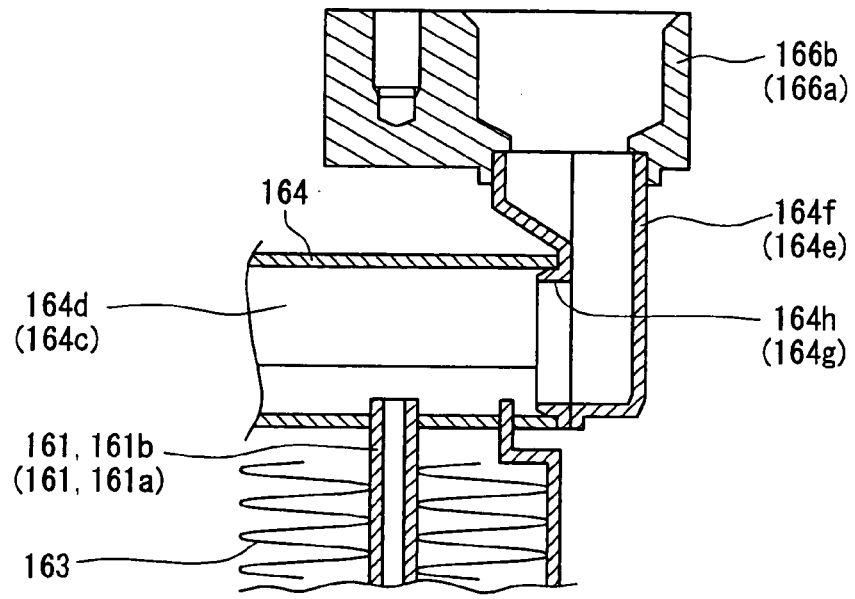
FIG. 12 is a cross-sectional view showing a portion close to an outlet joint in FIG. 11.
Figure 13:
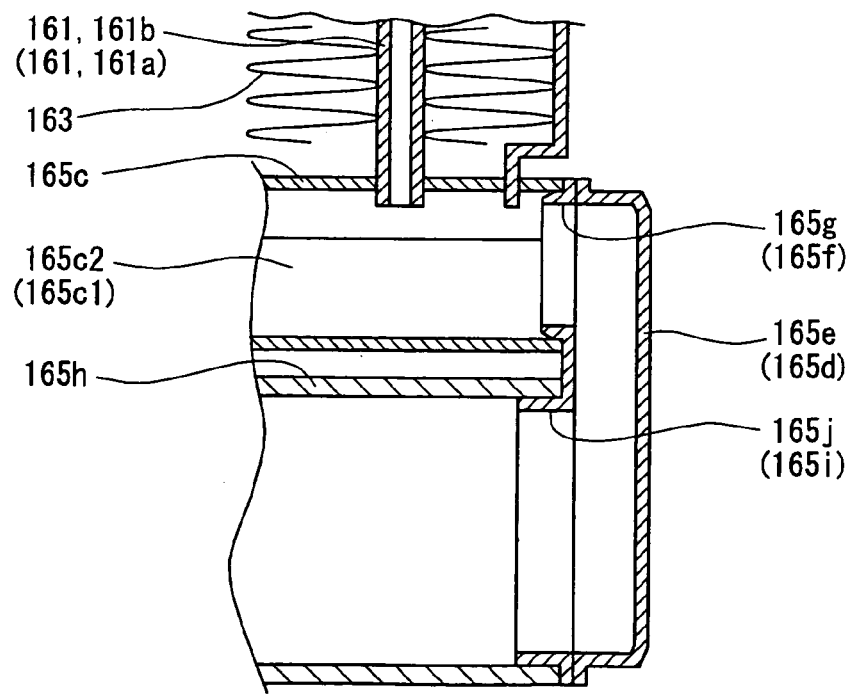
FIG. 13 is a cross-sectional view showing one end side of a lower tank in FIG. 11.

As shown in FIG. 11 to FIG. 13, the heat exchange part of the cold storage heat exchanger 160 is constructed of multiple tubes 161 layered (arranged) in two lines. Here, for the sake of convenience, a group of tubes of a first line on the back side of paper in FIG. 11 are referred to as first space tubes 161a and a group of tubes of a second line on the front side of paper in FIG. 11 are referred to as second space tubes 161b. Here, the fins 163 are set at a size corresponding to the depth of two lines of tubes 161 and are located between (bonded to) the respective tubes 161.

The upper tank 164 is formed of two cylindrical parts that are arranged in parallel and are bonded to each other at their side walls in the direction of length, and has one end portions in the direction of length of the tubes 161 bonded thereto. Further describing in detail, in the upper tank 164, a first space 164c and a second space 164d are formed by the two cylindrical parts. The first space tubes 161a are communicated with the first space 164c, and the second space tubes 161b are communicated with the second space 164d. An opening 164b is formed nearly in the center of a portion where the two cylindrical parts are bonded to each other (corresponding to a partition part in the present invention), just as with the first embodiment.

Flat cup tanks 164e, 164f are connected to both ends in the direction of length of the upper tank 164. The first space 164c of the upper tank 164 communicates with the inside of the cup tank 164e through a communication hole 164g, and the second space 164d of the upper tank 164 communicates with the inside of the cup tank 164f through a communication hole 164h.

The lower tank 165 is formed of a small tank 165c, a liquid tank 165h and cup tanks 165d, 165e. The small tank 165c is a tank having the nearly same specification as the upper tank 164 and has a first space 165c1 and a second space 165c2 formed therein by two cylindrical parts. The small tank 165c has other ends in the direction of length of the tubes 161 bonded thereto. That is, the first space tubes 161a communicate with the first space 165c1, and the second space tubes 161b communicate with the second space 165c2.

The liquid tank 165h is a tank made of a large-diameter cylindrical part having its inside diameter set larger than the respective cylindrical parts of the small tank 165c and is arranged under the small tank 165c. The total inside volume of the small tank 165c and the liquid tank 165h, just as with the first embodiment, is large enough to store a specified amount of liquid refrigerant condensed when superheated gas refrigerant flowing into the cold storage heat exchanger 160 is cooled by the cold storage material.

Flat cup tanks 165d, 165e are connected to both ends in the direction of length of the small tank 165c and the liquid tank 165h. The first space 165c1 of the small tank 165c communicates with the inside of the cup tank 165d through a communication hole 165f. Moreover, the second space 165c2 of the small tank 165c communicates with the inside of the cup tank 165e through a communication hole 165g. Further, a space in the liquid tank 165h communicates with the cup tanks 165d, 165e through communication holes 165i, 165j.

An inlet joint 166a is a block part formed in a cylindrical shape and is arranged on the cup tank 164e side of the upper tank 164 and is connected to the cup tank 164e so as to communicate with the inside of the cup tank 164e. An outlet joint 166b is a block part formed in a cylindrical shape, just as with the inlet joint 166a, and is arranged on the cup tank 164f side of the upper tank 164 and is connected to the cup tank 164f so as to communicate with the inside of the cup tank 164f.

The cold storage material tank 170 is formed of an upper tank 174 and a lower tank 175. Each of the tanks 174, 175, just as with the first embodiment, is formed of, for example, thin resin material by injection molding.

The upper tank 174 is a tank that is open to the lower tank 175 and is formed in the shape of a cover and has a size including the both joints 166a, 166b and the upper tank 164 of the cold storage heat exchanger 160. A mounting bracket 171, which is a part used to mount the cold storage tank unit 160C on the vehicle, is formed integrally with a portion nearly close to the center of the upper tank 174. Circular openings 174a, 174b, which are made at positions corresponding to the both joints 166a, 166b and have flange portions formed on their peripheries, are made in the upper tank 174.

The lower tank 175 is a flat half container having a large depth and has a size including the lower tank 165 and the heat exchange part of the cold storage heat exchanger 160. The upper tank 174 and the lower tank 175 are bonded to each other, for example, by bonding means such as resin fusion to form the cold storage material tank 170.

The cold storage material tank 170 has the cold storage heat exchanger 160 arranged therein and has a specified amount of cold storage material filled therein and has O-ring type packing 180 (two pieces) located between the outer peripheral portions of both joints 166a, 166b and the inner peripheral portions of the openings 174a, 174b (flange portions) to thereby form the cold storage tank unit 160C.

Figure 14:
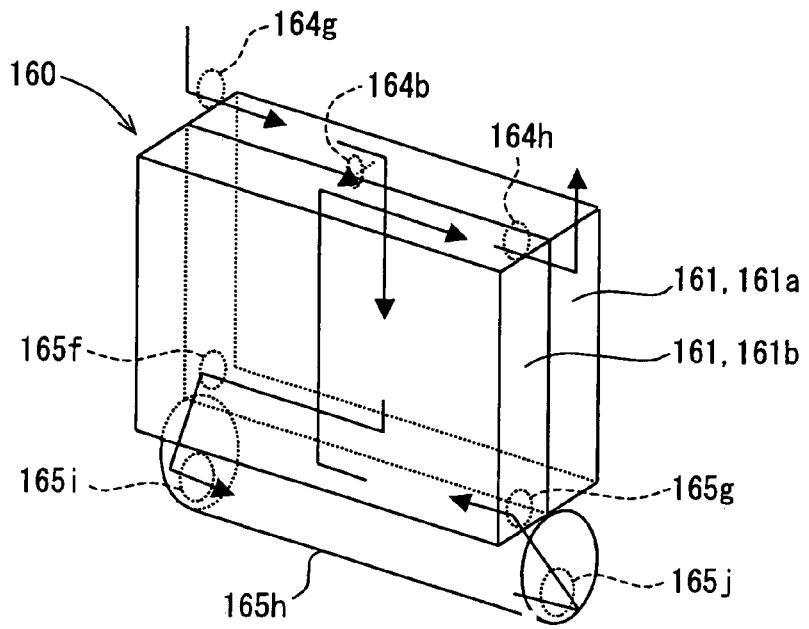
FIG. 14 is a schematic diagram showing a refrigerant flow in a cold storage heat exchanger during a cold storage mode in the sixth embodiment.
Figure 15:
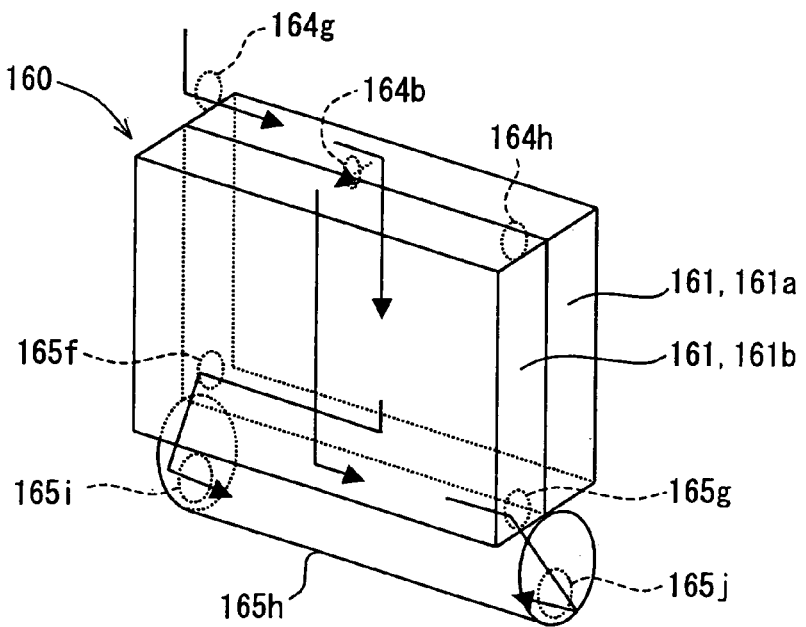
FIG. 15 is a schematic diagram showing a refrigerant flow in the cold storage heat exchanger during a cold release mode in the sixth embodiment.

Next, the operation of a refrigeration cycle apparatus 100 using the above-mentioned cold storage tank unit 160C will be described with reference to the drawings including FIG. 14 and FIG. 15 in addition. The cold storage tank unit 160C in the refrigeration cycle is located between the evaporator 150 and the compressor 110, just as with the first embodiment.

1. Cold Storage Mode

When the vehicle runs and the compressor 110 is driven by the engine, refrigerant compressed and discharged by the compressor 110 and flowing out of the evaporator 150 flows into the cold storage tank unit 160C. In the cold storage tank unit 160C, as shown in FIG. 14, the refrigerant flows from the inlet joint 166a of the cold storage tank unit 160C through the cup tank 164e → the communication passage 164g → the first space 164c of the upper tank 164 to the first space tubes 161a. Then, the refrigerant flows through the first space 165c1 of the small tank 165c → the communication holes 165f → the cup tank 165d → the communication hole 165i → the liquid tank 165h → the communication hole 165j → the cup tank 165e → the communication hole 165g → the second space 165c2 of the small tank 165c to the second space tubes 161b. Further, the refrigerant flows through the second space 164d of the upper tank 164 → the communication hole 164h → the cup tank 164f and flows out of the outlet joint 166b and returns to the compressor 110.

When the refrigerant having temperature lower than the melting point of the cold storage material flows through the first space tubes 161a and the second space tubes 161b in the above-mentioned flow of the refrigerant, the refrigerant changes the cold storage material in the cold storage material tank 170 from a liquid phase to a solid phase to store the latent heat of solidification. That is, the refrigerant cools the cold storage material in the cold storage material tank 170 to store cold.

In the above-mentioned flow of the refrigerant, a portion of refrigerant bypasses the heat exchange part (tubes 161) and flows out of the opening 164b of the upper tank 164 to the outlet joint 166b. Here, in the above-mentioned cold storage mode, by the flow of the refrigerant which is forcibly made a comparatively large amount (50 kg/h to 200 kg/h) by the operation of the compressor 110, the speed of flow of the refrigerant is increased and the resistance to flow of the refrigerant at the opening 164b is increased and the amount of flow rate of bypass of the refrigerant with respect to the heat exchange part is kept small and hence the most portion of refrigerant flows through the heat exchange part. Therefore, virtually, a reduction in cold storage capacity hardly occurs.

2. Cold Release Mode

When the vehicle is stopped and the engine is stopped and the compressor 110 is stopped, refrigerant flows through the expansion valve 140 into the evaporator 150 and the cold storage tank unit 160C, which are brought to low pressure side by pressure remaining in the refrigeration cycle.

Superheated gas refrigerant flowing out of the evaporator 150 flows into the cold storage tank unit 160C. In the cold storage tank unit 160C, as shown in FIG. 15, the refrigerant flows from the inlet joint 166a of the cold storage tank unit 160C through the cup tank 164e → the communication passage 164g → the first space 164c of the upper tank 164 to the first space tubes 161a. Moreover, the refrigerant also flows from the first space 164c of the upper tank 164 through the opening 164b → the second space 164d of the upper tank 164 to the second space tubes 161b.

In this regard, in the cold release mode, the compressor 110 is stopped, so that the flow rate of refrigerant is decreased as compared with the cold storage mode and the flow rate of refrigerant flowing through the second space tubes 161b is decreased to approximately ¼ or less times the flow rate in the cold storage mode, whereby the opening 164b is hardly resistant to flow of refrigerant but can flow the refrigerant.

When the superheated gas refrigerant having temperature higher than the melting point of the cold storage material flows through the first space tubes 161a and the second space tubes 161b in the above-mentioned flow of the refrigerant, the superheated gas refrigerant gives the cold storage material the latent heat of melting, thereby being cooled. That is, the superheated gas refrigerant is cooled, condensed, and liquefied by the cold of the cold storage material and flows down as liquid refrigerant by the gravity and flows from the first space 165c1 of the small tank 165c → the communication hole 165f → the cup tank 165d → the communication hole 165i to the liquid tank 165h. Moreover, the superheated gas refrigerant flows from the second space 165c2 of the small tank 165c → the communication hole 165g → the cup tank 165e → the communication hole 165j to the liquid tank 165h.

In short, the superheated gas refrigerant from the evaporator 150 is condensed and reduced in volume by all of the refrigerant tubes 161 (first and second space tubes 161a, 161b) of the cold storage heat exchanger 160 and is stored as liquid refrigerant in the lower tank 165 to keep pressure at low pressure. Hence, even when the compressor 110 is stopped, while the cold stored in the cold storage material is held, pressure remaining between the condenser 120 and the evaporator 150 can continuously flow the refrigerant into the evaporator 150 and hence can continuously cool the air-conditioning air by the evaporator 150.

3. Switching from Cold Release Mode to Cold Storage Mode

In the present embodiment, when the compressor 110 is again started at the time of again switching the above-mentioned cold release mode to a cold storage mode, liquid refrigerant stored in the lower tank 165 (the liquid tank 165h, the first and second spaces 165c1, 165c2 of the small tank 165c) first flows up through the second space tubes 161b and then flows through the second space 164d of the upper tank 164 → the communication hole 164h → the cup tank 164f → the outlet joint 166b and then is absorbed by the compressor 110. In this mode, from this timing, storing cold in the cold storage material in the cold storage material tank 170 is started by the refrigerant flowing through the second space tubes 161b when the compressor 110 is started.

In the first embodiment, when the cold release mode is switched to the cold storage mode, liquid refrigerant stored in the lower tank 165 flows through the return pipe 162, which does not perform a basic heat exchange function, and hence hardly stores cold in the cold storage material and returns to the compressor 110. Then, the liquid refrigerant flows through the condenser 120 → the liquid receiver 130 → the expansion valve 140 → the evaporator 150 and then returns to the cold storage heat exchanger 160 and, at this time, first starts to store cold. Hence, the time required to store cold is elongated by the time required to first circulate the refrigerant.

However, in this embodiment, when the cold release mode is switched to the cold storage mode as described above, the liquid refrigerant stored in the cold release mode can be made to flow through the second space tubes 161b as the heat exchange part and hence storing cold can be quickly started by these tubes 161b. Therefore, it is possible to shorten the time required to store cold and hence to improve cold storage capacity.

Moreover, in the cold release mode, the flow rate of refrigerant can be decreased as compared with the cold storage mode, so that the effect of the resistance to flow of the opening 164b can be decreased and the refrigerant can be substantially flowed through both of the first space tubes 161a and the second space tubes 161b by the opening 164b. Hence, it is possible to improve cold release capacity.

Furthermore, the cold storage heat exchanger 160 is basically formed of the tubes 161 and the upper tank 164 and the small tank 165c of the nearly same specification and the liquid tank 165h exclusively for storing liquid refrigerant is added to the bottom of the small tank 165c to construct the lower tank 165. Hence, the cold storage heat exchanger 160 can be formed only by adding the liquid tank 165h to a standard heat exchanger that is usually used and formed of the tubes 161 and a pair of tanks (164, 165c).

Still further, because the added liquid tank 165h is formed of the cylindrical part, as compared with a tank formed of multiple planes like a rectangular body, for example, described in the first embodiment, the resistance to pressure of the liquid tank 165h can be increased. Hence, even when the volume of the liquid tank 165h needs to be increased so as to store a specified amount of liquid refrigerant, it is possible to eliminate the need for providing a reinforcing structure and the like.

Still further, the cold storage material tank 170 is a container including the whole of the cold storage heat exchanger 160, and the openings 174a, 174b are formed at positions corresponding to the inlet joint 166a and the outlet joint 166b, and the O-ring type packing 180 are respectively located between the outer peripheral surfaces of the joints 166a, 166b and the inner peripheral surfaces of the openings 174a, 174b. Hence, as compared with the first embodiment, the respective joints 166a, 166b can be sealed in the range of short peripheral length and hence can be surely sealed with stability and with ease. That is, the effects of the size tolerances and variations in actual sizes of the respective parts can be reduced and the packing 180 can be ensured reliable compression width along the whole periphery and hence can stably seal the respective joints 166a, 166b.

Seventh Embodiment

Figure 16:
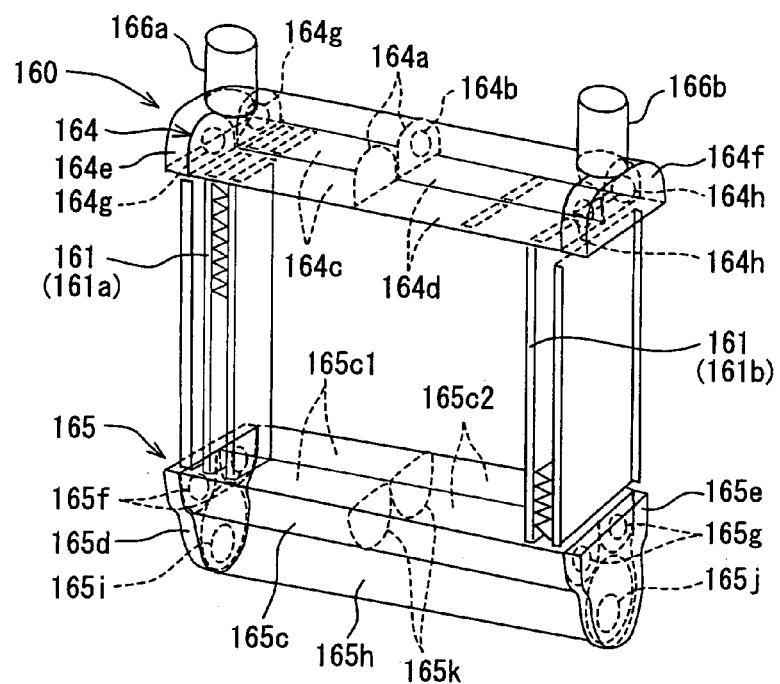
FIG. 16 is a perspective view showing a cold storage heat exchanger in a seventh embodiment.
Figure 17:
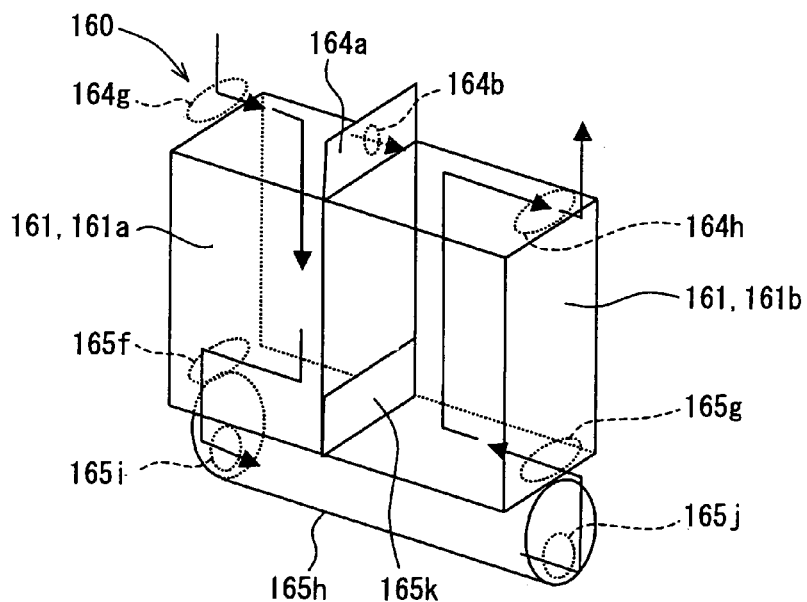
FIG. 17 is a schematic diagram showing a refrigerant flow in the cold storage heat exchanger during a cold storage mode in the seventh embodiment.
Figure 18:
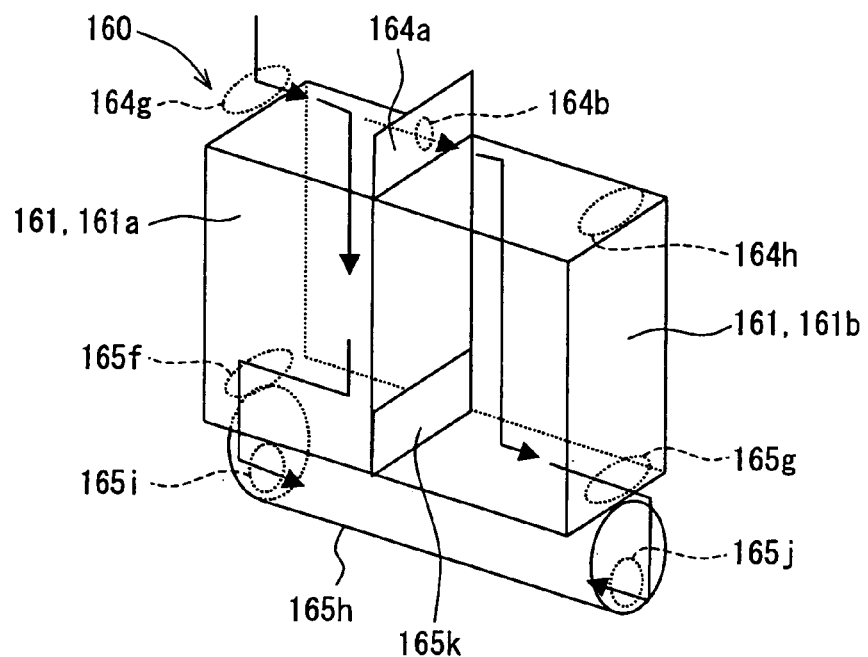
FIG. 18 is a schematic diagram showing a refrigerant flow in the cold storage heat exchanger during a cold release mode in the seventh embodiment.

A seventh embodiment of the present invention is shown in FIG. 16 to FIG. 18. The seventh embodiment is such that, as compared with the sixth embodiment, the first space 164c and the second space 164d of the upper tank 164c and first space 165c1 and the second space 165c2 of the small tank 165c are formed by different forming methods. Here, in FIG. 16 to FIG. 18, the same parts as in the sixth embodiment are denoted by the same reference symbols and their repeated descriptions will be omitted and only different points will be described.

In the cold storage heat exchanger 160 of this embodiment, a separator 164a is arranged nearly in the center in the direction of length of the upper tank 164 to form the first space 164c on the left side in FIG. 16 and the second space 164d on the right side. An opening 164b is made in the separator 164a. Moreover, a separator 165k is arranged also nearly in the center in the direction of length of the small tank 165c on the lower side to form the first space 165c1 on the left side in FIG. 16 and the second space 165c2 on the right side. Here, the ends in the direction of length of the respective tanks 164, 165c, each of which is formed of two cylindrical parts arranged in parallel, are opened to form communication holes 164g, 164h, 165f, and 165g.

Hence, of the tubes 161 arranged in multiple lines, a group of tubes on the left side in FIG. 16 become the first space tubes 161a and a group of tubes on the right side in FIG. 16 become the second space tubes 161b in correspondence with the above-mentioned first spaces 164c, 165c1 and second spaces 164d, 165c2, respectively.

In the cold storage heat exchanger 160 of this embodiment, as shown in FIG. 17, in the cold storage mode, refrigerant flows down in the first space tubes 161a on the left side and flows through the liquid tank 165h and flows up in the second space tubes 161b on the right side and stores cold in the cold storage material in the cold storage material tank 170.

Moreover, as shown in FIG. 18, in the cold release mode, the refrigerant flows down in the first space tubes 161a on the left side and flows through the opening 164b and flows down in the second tubes 161b on the right side and is cooled by the cold of the cold storage material in the cold storage material tank 170, thereby being condensed and liquefied and stored in the liquid tank 165h.

When the cold release mode is switched to the cold storage mode, the liquid refrigerant in the liquid tank 165h flows through the second space tubes 161b on the right side and is sucked by the compressor 110 and starts storing cold in the cold storage material in the cold storage material tank 170.

As described above, in this embodiment, the flow of refrigerant between the first space tubes 161a, the second space tubes 161b, and the liquid tank 165h (lower tank 165) can be made the same in both modes as that in the sixth embodiment. Hence, this embodiment can produce the same effect as the sixth embodiment.

Eighth Embodiment

Figure 19:
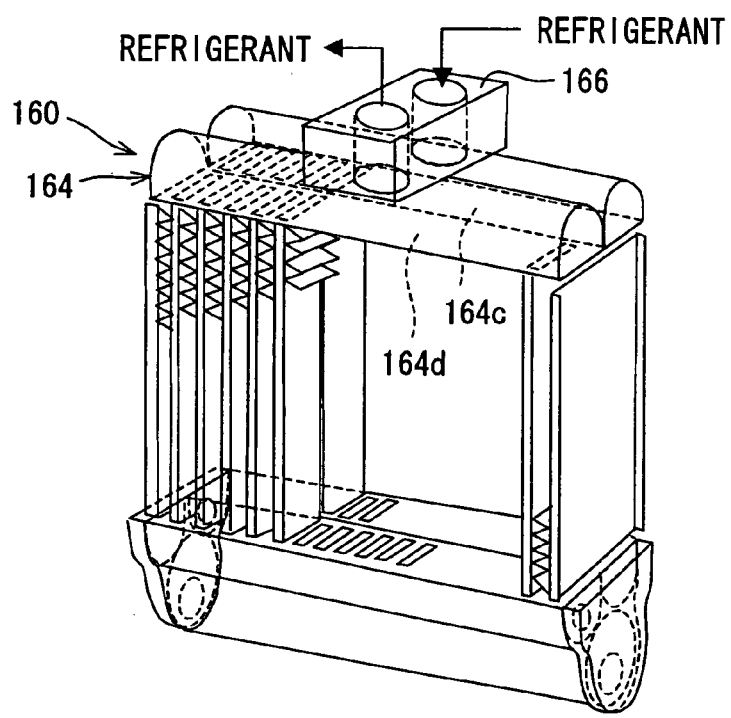
FIG. 19 is a perspective view showing a cold storage heat exchanger in an eighth embodiment.

An eighth embodiment of the present invention is shown in FIG. 19. The eighth embodiment is such that, as compared with the sixth embodiment, the inlet joint 166a is integrated with the outlet joint 166b.

Here, the communication holes 164g, 164h made in the ends in the direction of length of the upper tank 164 are eliminated and the cup tanks 164e, 164f are eliminated. The inlet joint (166a) and the outlet joint (166b) are formed in a joint 166 made of one block. That is, the joint 166 is a rectangular block and has two passages (corresponding to the inlet joint and the outlet joint), which are cut through so as to be close to each other, formed therein. The joint 166 is arranged nearly in the center in the direction of length of the upper tank 164 and one of the two passages is made to communicate with the inside of the first space 164c of the upper tank 164 and the other is made to communicate with the inside of the second space 164d.

With this, the cup tanks 164e, 164f can be eliminated and the inlet joint 166a and the outlet joint 166b are formed in one joint 166, which can reduce the number of parts and can reduce cost.

Ninth Embodiment

Figure 20:
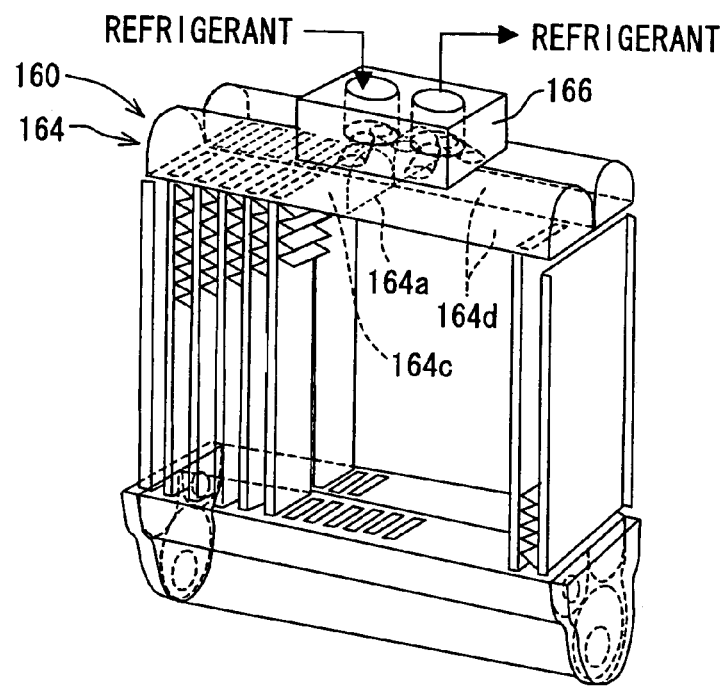
FIG. 20 is a perspective view showing a cold storage heat exchanger in a ninth embodiment.

A ninth embodiment of the present invention is shown in FIG. 20. The ninth embodiment is such that, as compared with the seventh embodiment, the inlet joint 166a is integrated with the outlet joint 166b.

Here, the communication holes 164g, 164h formed in the ends in the direction of length of the upper tank 164 are eliminated and the cup tanks 164e, 164f are eliminated. Moreover, the separator 164a is arranged nearly in the center in the direction of length of the upper tank 164 to form the first space 164c on the left side in FIG. 20 and the second space 164d on the right side.

The inlet joint (166a) and the outlet joint (166b) are formed in the joint 166 made of one block, just as with the above-mentioned eighth embodiment. That is, the joint 166 as a block has two passages (corresponding to an inlet joint and an outlet joint), which are cut through in the shape of an inverted letter Y so as to be close to each other, are formed therein. The joint 166 is arranged nearly in the center in the direction of length of the upper tank 164 and one of the two passages is made to communicate with the inside of the first space 164c of the upper tank 164 and the other is made to communicate with the inside of the second space 164d.

With this, just as with the above-mentioned eighth embodiment, the cup tanks 164e, 164f can be eliminated and the inlet joint 166a and the outlet joint 166b are formed in one joint 166, which can reduce the number of parts and can reduce cost.

Tenth Embodiment

Figure 21:
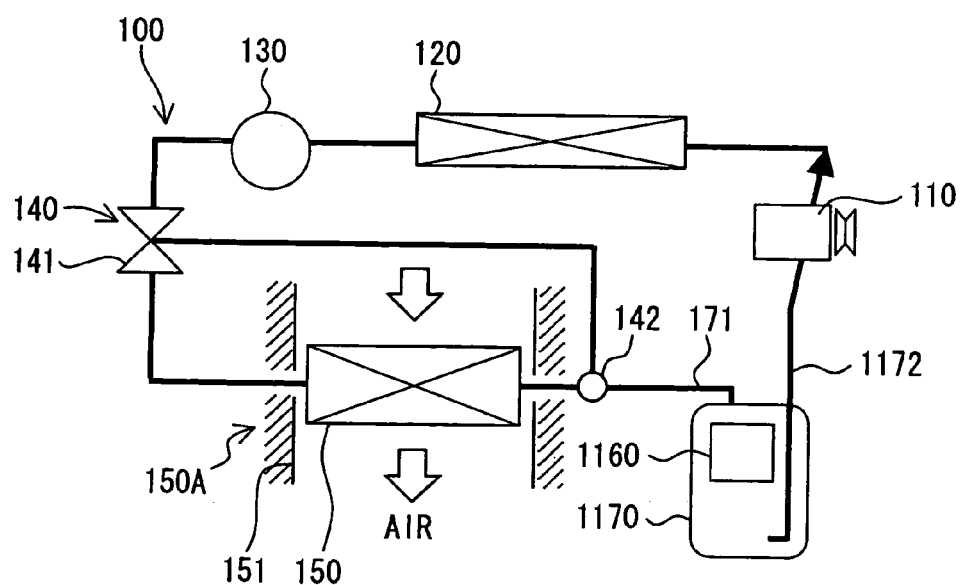
FIG. 21 is a schematic diagram showing the general construction of a refrigeration cycle apparatus in a tenth embodiment.
Figure 22:
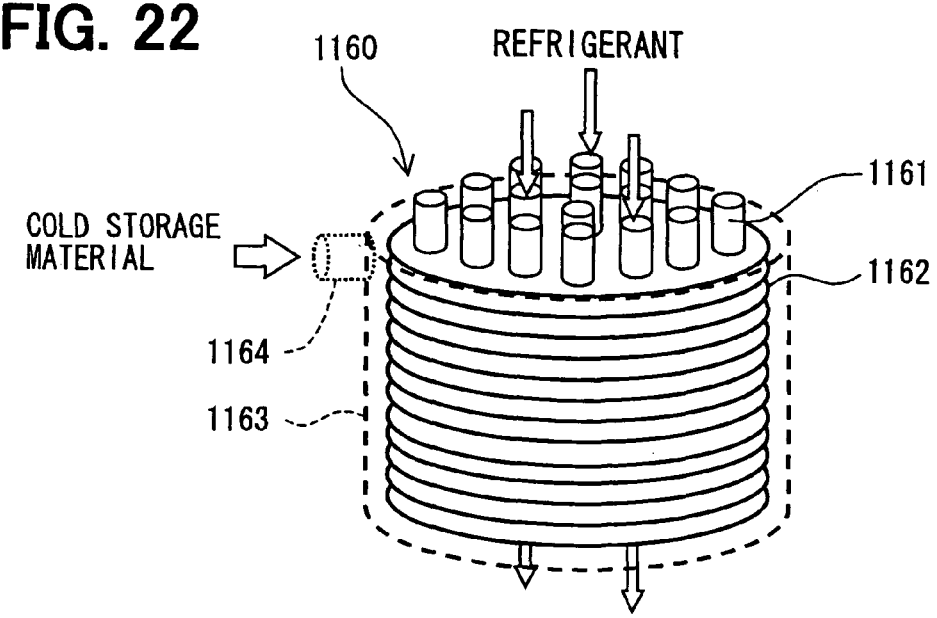
FIG. 22 is a perspective view showing a cold storage heat exchanger of the tenth embodiment.
Figure 23:
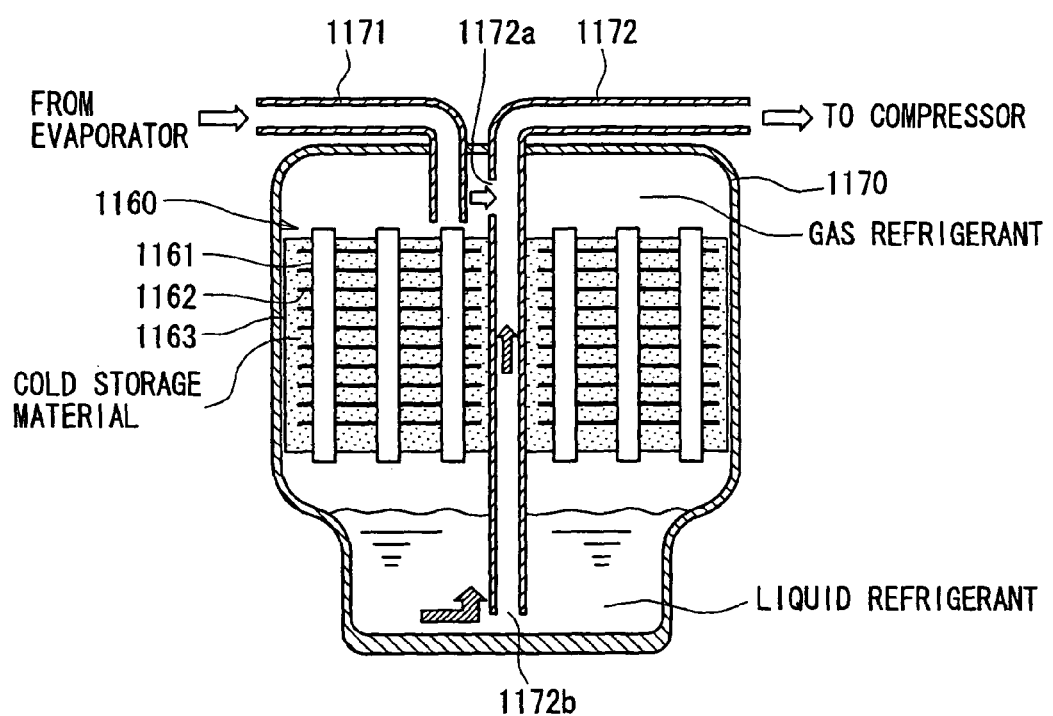
FIG. 23 is a cross-sectional view showing the cold storage heat exchanger and a cold storage material tank of the tenth embodiment.

In a tenth embodiment, a refrigeration cycle apparatus 100 for a vehicle is typically applied to a so-called idling stop vehicle in which an engine is stopped when a vehicle is shifted from a running state to a stopping state where the engine is idled, for example, when the vehicle waits at a traffic light. The basic construction of the refrigeration cycle apparatus 100 will be described by the use of FIG. 21 to FIG. 23. Here, FIG. 21 is a schematic diagram showing the general construction of the refrigeration cycle apparatus 100. FIG. 22 is a perspective view showing a cold storage heat exchanger 1160. FIG. 23 is a cross-sectional view showing a cold storage heat exchanger 1160 and a cold storage material tank 1170.

The refrigeration cycle apparatus 100 transfers heat on a low temperature side to a high temperature side to use cold and heat for air conditioning. As shown in FIG. 21, the refrigeration cycle apparatus 100 is constructed of: a cycle in which a usual compressor 110, a condenser 120, a liquid receiver tank 130, a temperature type expansion valve 140, and an evaporator 150 are connected in series in the shape of a ring; and a cold storage heat exchanger 1160 and a cold storage material tank 1170, both of which are added to the cycle.

The compressor 110 is a fluid machine that is operated by a driving source of an engine (not shown) of a vehicle to compress refrigerant in the refrigeration cycle apparatus 100 to a high-temperature and high-pressure state to thereby discharge the refrigerant. The condenser 120 is a heat exchanger that is arranged on the refrigerant discharge side of the compressor 110 and cools the refrigerant compressed to the high-temperature and high-pressure state to thereby condense and liquefy the refrigerant. The liquid receiver tank 130 is a receiver that separates the refrigerant condensed by the condenser 120 into vapor-phase refrigerant and liquid-phase refrigerant and flows out the liquid-phase refrigerant.

The temperature type expansion valve 140 reduces the pressure of the liquid-phase refrigerant separated by the liquid receiver tank 130 to expand the liquid-phase refrigerant in an isenthalpic manner and includes a valve part 141 and a temperature sensing part 142 arranged on the refrigerant outflow side of the evaporator 150. That is, the temperature sensing part 142 is located between the evaporator 150 and the cold storage heat exchanger 1170. In the expansion valve 140, the throttle opening of the valve part 141 is controlled according to a refrigerant temperature sensed by the temperature sensing part 142 to bring the degree of superheat of the refrigerant flowing out of the evaporator 150 to a specified value (for example, from 5° C. to 10° C.).

The evaporator 150 is a heat exchanger that evaporates the refrigerant having pressure reduced by the expansion valve 140 to absorb heat and is arranged in an air-conditioning case 151 and cools (absorbs heat from) air-conditioning air supplied into this air-conditioning case 151. In addition, a blower for blowing air-conditioning air, a heat exchanger for heating air-conditioning air, and an air mixing door mechanism for adjusting the mixing ratio of cooling air and heating air, which are not shown in the drawing, are arranged in the air-conditioning case 151 and form an interior unit 150A. This interior unit 150A is arranged in an instrument panel in a vehicle compartment.

The cold storage heat exchanger 1160 is located between the evaporator 150 and the compressor 110 in such a way as to be in series with the evaporator 150. The cold storage heat exchanger 1160 is a heat exchanger that exchanges heat between refrigerant flowing out of the evaporator 150 and a cold storage material stored therein.

Specifically, the cold storage heat exchanger 1160 is a heat exchanger of a shell and tube type. As shown in FIG. 22, multiple refrigerant tubes 1161 are passed through multiple layered circular plate fins 1162 in the direction in which the plate fins 1162 are layered and these refrigerant tubes 1161 and the plate fins 1162 are thermally joined to each other and are arranged in a casing (shell) 1163. Here, both ends in the direction of length of the respective refrigerant tubes 1161 are open to the outside of the casing 1163. Further, a cold storage material is sealed in the casing 1163 from a cold storage material enclosing part 1164. After the cold storage material is enclosed in the casing 1163, the cold storage material enclosing part 1164 is sealed, and the cold storage material is brought into contact with the surfaces of the refrigerant tubes 1161 and the plate fins 1162. Paraffin, ice, or the like can be used as the cold storage material.

Furthermore, a cold storage material tank 1170 for storing refrigerant, which is condensed and liquefied when the cold storage material radiates cold in the cold storage heat exchanger 1160, is located between the above-mentioned cold storage heat exchanger 1160 and the compressor 110. Here, the cold storage material tank 1170 is arranged under the cold storage heat exchanger 1160, and the cold storage heat exchanger 1160 is integrated with the cold storage material tank 1170.

That is, as shown in FIG. 23, the cold storage material tank 1170 is an approximately cylindrical tank that has its axis pointed in the vertical direction and has both ends closed, and has a lower side portion contracted in diameter. The cold storage heat exchanger 1160 is arranged on the upper side in the cold storage material tank 1170 in such a way that the direction of length of the refrigerant tube 1161 is pointed in the vertical direction. In the cold storage material tank 1170, a small space is formed on the upper side of the cold storage heat exchanger 1160 and a large space is formed on the lower side. The upper ends of the refrigerant tubes 1161 of the cold storage heat exchanger 1160 communicate with the small space and the lower ends of the refrigerant tubes 1161 communicate with the large space. The large space, as will be described later, is a tank storage portion for storing refrigerant condensed and liquefied when the cold storage material radiates cold in the cold storage heat exchanger 1160.

The cold storage material tank 1170 is provided with an inflow pipe 1171, which is connected to the outflow side of the evaporator 150 and communicates with the small space of the cold storage material tank 1170, and an outflow pipe 1172, whose opening end 1172b is positioned at the lower end side of the large space and which is passed through the cold storage heat exchanger 1160 and is connected to the suction side of the compressor 110 through the upper outside of the cold storage material tank 1170. An opening 1172a communicating with this small space is formed in a portion corresponding to the small space of the outflow pipe 1172. The opening end 1172b of the outflow pipe 1172 is formed in a slender shape and the area of the opening end 1172b is smaller than the area of the opening 1172a.

In this regard, the cold storage heat exchanger 1160 and the cold storage material tank 1170 that are integrated with each other are arranged in the engine room of the vehicle. However, preferably, the cold storage heat exchanger 1160 and the cold storage material tank 1170 are arranged in the vehicle compartment, when the vehicle compartment has a space to allow them to be mounted.

Next, the operation and effect of the refrigeration cycle apparatus 100 based on the above-mentioned construction will be described.

1. Cold Storage Mode

When the vehicle runs, the compressor 110 is driven by the engine to operate the refrigeration cycle apparatus 100. The refrigerant compressed by and discharged from the compressor 110 is condensed and liquefied by the condenser 120 and is passed through the liquid receiver tank 130 and is reduced in pressure by the expansion valve 140. Then, the refrigerant absorbs heat from air-conditioning air and evaporates in the evaporator 150 to thereby cool the air-conditioning air (performs air conditioning).

The refrigerant flowing out of the evaporator 150 passes through the inflow pipe 1171 and passes through the refrigerant tubes 1161 of the cold storage heat exchanger 1160 and cools the cold storage material (the cold storage material has its heat absorbed by the refrigerant, thereby being cooled). The refrigerant absorbing heat from the evaporator 150 and the cold storage heat exchanger 1160 is brought into superheated gas refrigerant. The refrigerant introduced into the cold storage heat exchanger 1160 passes through the refrigerant tubes 1161 and reaches the large space in the cold storage material tank 1170, and then is absorbed from the opening 1172a or the opening end 1172b of the outflow pipe 1172 and is returned to the compressor 110. Here, thermal load in the vehicle compartment and thermal load of cooling this cold storage material become the total air-conditioning load of the refrigeration cycle apparatus 100. When cold storage by the cold storage material is finished, heat transfer between the refrigerant and the cold storage material in the cold storage heat exchanger 1160 is stopped.

2. Cold Release Mode

When the vehicle is stopped and the engine is stopped, the compressor 110 is also stopped. At this time, in the refrigeration cycle apparatus 100, the refrigerant is caused by its remaining pressure to flow from the condenser 120 and the liquid receiver tank 130, which are on the high pressure side, into the evaporator 150, the cold storage heat exchanger 1160, and the cold storage material tank 1170, which are on the low pressure side, through the expansion valve 140.

The refrigerant flowing into the evaporator 150 exchanges heat with the air-conditioning air to cool the air-conditioning air, thereby being brought into superheated gas refrigerant, and then flows through the inflow pipe 1171 into the cold storage heat exchanger 1160 to be cooled, condensed, and liquefied by the cold stored in the cold storage material. The condensed liquid refrigerant is stored in the large space on the lower side of the cold storage material tank 1170 by the gravity.

In short, the superheated gas refrigerant from the evaporator 150 is condensed and is reduced in volume by the cold storage heat exchanger 1160 to keep its pressure at low pressure. Hence, even when the compressor 110 is stopped, while the cold stored in the cold storage material is held, the refrigerant can continuously flow into the evaporator 150 by the remaining pressure between the condenser 120 and the evaporator 150 and can continuously cool the air-conditioning air by the evaporator 150.

Hence, there is provided the refrigeration cycle apparatus 100 for a vehicle that can continuously perform a refrigeration function even when the compressor 110 is stopped without additionally arranging the evaporator 150 in the interior unit 150A.

Moreover, because the cold storage material tank 1170 has the lower space part arranged under the cold storage heat exchanger 1160, the liquid refrigerant condensed by the cold storage material flows down into the cold storage material tank 1170 by the gravity. Hence, this can prevent the liquid refrigerant from staying in the cold storage heat exchanger 1160 and can exchange heat between the cold storage material in the cold storage heat exchanger 1160 and the refrigerant with high efficiency. That is, the condensed liquid refrigerant does not remain as thick films on the inner wall surfaces of the refrigerant tubes 1161 of the cold storage heat exchanger 1160, which results in securing the surfaces of the refrigerant tubes 161, through which heat is transferred to the cold storage material, to a sufficient extent and hence in exchanging heat between them with high efficiency.

Moreover, because the cold storage heat exchanger 1160 is integrated with the cold storage material tank 1170, the refrigeration cycle apparatus 100 can be made compact.

In the above-mentioned cold release mode, when the vehicle is shifted to a running state, the engine is started and the compressor 110 is also operated. The compressor 110 sucks mainly superheated gas refrigerant from the opening 1172a having an opening area set large in the outflow pipe 1172, so that the refrigeration cycle apparatus 100 can be operated without causing a trouble by liquid compression.

Here, because the opening end 1172b of the outflow pipe 1172 is open to the lower side of the large space of the cold storage material tank 1170, the compressor 110 simultaneously sucks a portion of liquid refrigerant stored in the large space. Usually, in the refrigeration cycle apparatus 100, liquid refrigerant is mixed with lubrication oil and the compressor 110 is replenished with this lubrication oil along with the liquid refrigerant, so that the durability of the compressor 110 can be kept and improved.

Moreover, the temperature sensing part 142 of the expansion valve 140 is located between the evaporator 150 and the cold storage heat exchanger 160. Hence, the temperature sensing part 142 can be integrated with the temperature type expansion valve 140 by setting the inlet side and the outlet side of the refrigerant in the evaporator 150 on the same side.

In this regard, as to the condenser 120, there is a case where a liquid receiver tank is integrally constructed as a modulator tank in the condenser 120 of the type in which the refrigerant is cooled to a supercooling range (so-called sub-cool condenser). In this case, the liquid receiver tank 130 may be omitted.

Still further, in the refrigeration cycle apparatus 100 of the type of the present embodiment, as the amount of refrigerant on the high pressure side is larger, a longer cold release time can be secured. Hence, in the case where the time during which the compressor 110 can be stopped needs to be kept longer than a specified time, it is also recommendable to arrange this additional liquid receiver tank 130 or to enlarge the capacity of the liquid receiver tank 130 or the diameter of high-pressure piping.

Eleventh Embodiment

Figure 24:
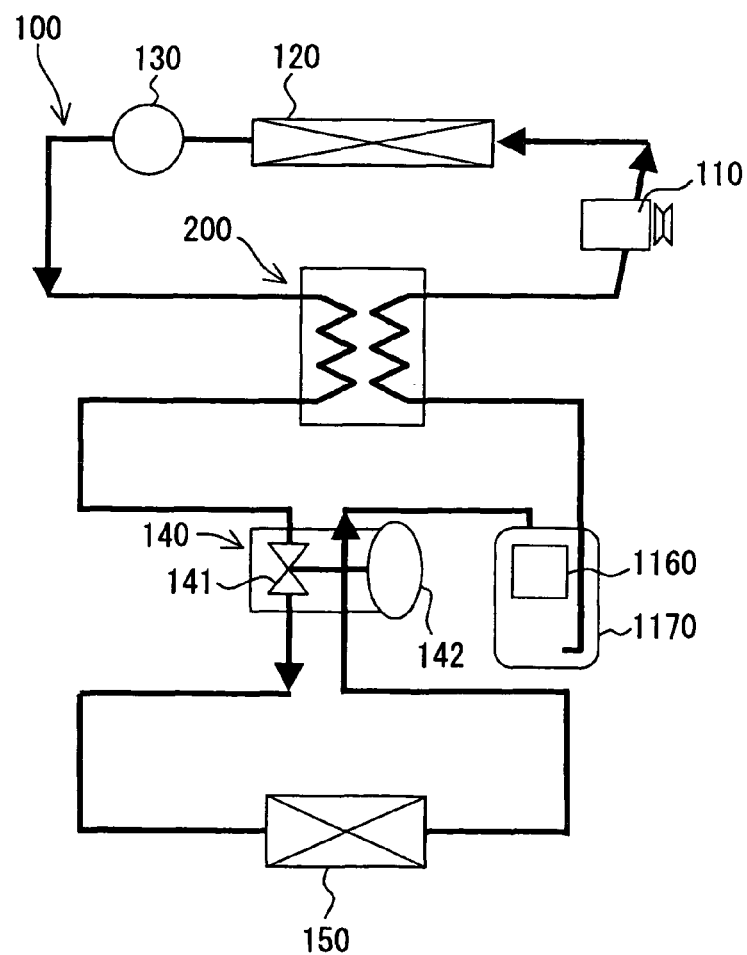
FIG. 24 is a schematic diagram showing the general construction of a refrigeration cycle apparatus in an eleventh embodiment.

An eleventh embodiment of the present invention will be shown in FIG. 24. The eleventh embodiment is such that, as compared with the tenth embodiment, an internal heat exchanger 200 is added to the refrigeration cycle apparatus 100.

The internal heat exchanger 200 exchanges heat between high-pressure side refrigerant between the condenser 120 and the expansion valve 140 (specifically, the liquid receiver tank 130 and the expansion valve 140) and low-pressure side refrigerant between the cold storage tank unit 1170 and the compressor 110. The internal heat exchanger 200 is formed in such a way that, for example, a low-pressure side pipe, through which the above-mentioned low-pressure side refrigerant flows, is arranged in a specified range (specified length) of a high-pressure side pipe, through which the above-mentioned high-pressure side refrigerant flows. In short, the high-pressure side refrigerant flows between the high-pressure side pipe and the low-pressure side pipe to thereby exchange heat with the low-pressure side refrigerant flowing through the low-pressure side pipe. The high-pressure side refrigerant is supercooled by the low-pressure side refrigerant, and the low-pressure side refrigerant is superheated by the high-pressure side refrigerant.

Moreover, here, the refrigerant before flowing into the compressor 110 is superheated by the internal heat exchanger 200 as described above, so that the refrigerant flowing out of the evaporator 150 is not superheated (is decreased in the degree of superheat) as much as possible. Specifically, the expansion valve 140 is adjusted so as to bring the degree of superheat to within a range from 0° C. to 3° C. For example, the setting of throttle opening is more increased with respect to a refrigerant temperature at the temperature sensing part 142 so as to bring the degree of superheat to within a range from 0° C. to 3° C.

In the eleventh embodiment constructed in this manner, the same cold storage mode and cold release mode as in the tenth embodiment are performed by the cold storage heat exchanger 1160 and the cold storage material tank 1170 to thereby continue a refrigeration function when the compressor 110 is stopped.

Moreover, because the low-pressure side refrigerant can be superheated by the internal heat exchanger 200, the refrigerant flowing out of the evaporator 150 is not superheated by the setting of the expansion valve 140. Hence, the temperature of refrigerant flowing into the cold storage heat exchanger 1160 is decreased without decreasing the pressure of the refrigerant in the evaporator 150, in other words, without reducing the coefficient of performance (COP) of a refrigerator as the refrigeration cycle apparatus 100, whereby cold can be surely stored in the cold storage material.

Furthermore, the addition of the internal heat exchanger 200 can increase the degree of supercooling of the refrigerant flowing from the condenser 120 into the evaporator 150 and can increase the amount of liquid-phase refrigerant flowing out of the condenser 120 to thereby supply the evaporator 150 with the increased amount of liquid-phase refrigerant. Hence, in the evaporator 150, as the amount of liquid-phase refrigerant increases, the resistance to flow of the refrigerant is decreased and the cooling performance of air-conditioning air can be improved. Furthermore, the degree of superheat in the evaporator 150 can be set at a small value and hence the temperature of the refrigerant is decreased to increase the temperature difference between the refrigerant and the air-conditioning air to thereby improve the cooling performance of the air-conditioning air. The refrigerant flowing out of the cold storage material tank 1170 is superheated by the internal heat exchanger 200, thereby being surely brought to vapor-phase refrigerant. Hence, it is possible to prevent liquid compression in the compressor 110.

In this regard, the degree of superheat in the evaporator 150 is within a range, for example, from 0° C. to 3° C. in the above description. However, when a specified degree of superheat is realized (vapor-phase refrigerant is produced) in the internal heat exchanger 200, it is also recommended that the refrigerant never has the degree of superheat in the evaporator 150, that is, the degree of superheat is made not higher than 0° C. to thereby bring the refrigerant into the state of two phases of a vapor phase and a liquid phase.

Twelfth Embodiment

A twelfth embodiment of the present invention is shown in FIG. 25. The twelfth embodiment is constructed such that, as compared with the eleventh embodiment, a fixed throttle part 191 is arranged in parallel to the expansion valve 140.

Specifically, there is provided a bypass passage 190 bypassing the valve part 141 of the expansion valve 140, and this bypass passage 190 is provided with the fixed throttle part 191 having its opening fixed to a specified opening.

In the cold storage mode while the compressor 110 is operated, the expansion valve 140 opens the valve part 141 to a specified opening according to the refrigerant temperature (degree of superheat of refrigerant) of the temperature sensing part 142. However, in the cold release mode, there is a case where the compressor 110 is stopped to increase the low-pressure side pressure whereas the valve part 141 is gradually closed because the temperature sensing part 142 is cooled.

In this manner, air cooling capacity in the cold release mode is limited by the opening of the expansion valve 140 at this time. However, because this twelfth embodiment is provided with the fixed throttle part 191, the refrigerant flowing out of the condenser 120 can be made to flow into the evaporator 150 through the fixed throttle part 191 irrespective of the variable throttle opening of the expansion valve 140. Hence, the air cooling capacity when the compressor 110 is stopped can be secured.

Other Embodiments

Although the present invention has been fully described in connection with the preferred embodiments thereof with reference to the accompanying drawings, it is to be noted that various changes and modifications will become apparent to those skilled in the art.

For example, the descriptions have been provided in the above-mentioned tenth to twelfth embodiments on the assumption that the cold storage heat exchanger 1160 is a cold storage heat exchanger of a shell and tube type. However, the cold storage heat exchanger 1160 is not necessarily limited to the shell and tube type but may be constructed in such a way that, as shown in FIGS. 26A to 26C, a specified casing (not shown) is filled with cold storage capsules (bar-shaped capsules 1165*a*, ball-shaped capsules 1165*b*, and bale-shaped capsules 1165*c*) and that refrigerant flows through the interspaces between the cold storage capsules 1165.

Moreover, as to the cold storage material tank 1170 in the above-mentioned respective embodiments, when the elimination of the cold storage material tank 1170 does not have a bad effect on the heat exchange performance by the refrigerant condensed and liquefied in the cold storage heat exchanger 1160, the cold storage material tank 1170 may be eliminated. When the cold storage material tank 1170 is not arranged, the low-pressure side refrigerant of the internal heat exchanger 200 in the eleventh and thirteenth embodiments is refrigerant between the cold storage heat exchanger 1160 and the compressor 110.

Still further, the cold storage material tank 1170 is not necessarily positioned under the cold storage heat exchanger 1160 in the respective embodiments but may be positioned at the other position. Furthermore, the cold storage heat exchanger 1160 and the cold storage material tank 1170 may be separated from each other.

Still further, the internal heat exchanger 200 does not necessarily have a double tube structure but may have a structure in which: two passages are formed in parallel; high-pressure side refrigerant flows through one of them; low-pressure side refrigerant flows through the other; and heat is exchanged between both refrigerants.

In the above-mentioned respective embodiments, the cold storage heat exchanger 160 is a multi-flow type heat exchanger constructed of the refrigerant tubes 161 and both tanks 164, 165. However, a heat exchanger of a layered type may be used in which multiple tube plates formed by press processing are bonded to each other, thereby being layered.

Moreover, in the above-described first to ninth embodiments, the cold storage heat exchanger 160 is set in such a way that the refrigerant tubes 161 are pointed nearly in the vertical direction in the above-mentioned respective embodiments but is not necessarily set in this way. When the lower end of the lower tank 165 is arranged under the lower end of the upper tank 164, the cold storage heat exchanger 160 may be inclined to a certain extent (for example, inclined to the left or right or back or forth with respect to paper in FIG. 2).

Still further, it has been described that the cold storage material tank 170 is formed of resin material. However, the cold storage material tank 170 is not necessarily formed of resin material but may be formed of, for example, thin metal material such as aluminum or aluminum alloy.

Still further, the present invention can be applied to a refrigeration cycle apparatus 100 that is required to exert refrigeration capacity in the evaporator 150 even after the refrigeration cycle is stopped. For example, a vehicle mounted with the refrigeration cycle apparatus 100 may be not only an idle stop vehicle but also a hybrid vehicle having an engine and a motor for running.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A cold storage tank unit for a refrigeration cycle apparatus having an evaporator, the cold storage tank unit being arranged in series with the evaporator on a low pressure side after pressure-reduced in the refrigeration cycle apparatus, the cold storage tank unit comprising:
a cold storage heat exchanger including a plurality of tubes extending in a tube longitudinal direction in which refrigerant flows, and a pair of first and second tanks connected to longitudinal ends of the tubes at two end sides in the tube longitudinal direction to communicate with the tubes;
a cold storage material tank which accommodates at least the tubes of the cold storage heat exchanger; and
a cold storage material filled in the cold storage material tank, the cold storage material being cold-stored by refrigerant or being cold-released to cool gas refrigerant evaporated in the evaporator, wherein
the second tank has a lower end portion that is positioned lower than a lower end portion of the first tank, and the second tank has a tank capacity capable of storing a predetermined liquid refrigerant condensed by cold storage heat of the cold storage material; and
the cold storage heat exchanger includes
a first partition member which partitions an inner space of the first tank into a first space and a second space,
an inflow portion, communicating with the first space, for introducing refrigerant into the first space, and
an outflow portion, communicating with the second space, for flowing out refrigerant.

2. The cold storage tank unit according to claim 1, wherein the first partition member has an opening portion having a predetermined open area through which the first space and the second space communicate with each other.

3. The cold storage tank unit according to claim 1, wherein:
the plurality of tubes includes one tube communicating with the second space of the first tank; and
the one tube has a passage sectional area approximately corresponding to a refrigerant pipe connected to the evaporator.

4. The cold storage tank unit according to claim 3, wherein the one tube extends into the second tank, and communicates with an inside of the second tank at a position close to the lower end portion of the second tank.

5. A cold storage tank unit for a refrigeration cycle apparatus having an evaporator, the cold storage tank unit being arranged in series with the evaporator on a low pressure side after pressure-reduced in the refrigeration cycle apparatus, the cold storage tank unit comprising:
a cold storage heat exchanger including a plurality of tubes extending in a tube longitudinal direction in which refrigerant flows, and a pair of first and second tanks connected to longitudinal ends of the tubes at two end sides in the tube longitudinal direction to communicate with the tubes;
a cold storage material tank which accommodates at least the tubes of the cold storage heat exchanger; and
a cold storage material filled in the cold storage material tank, the cold storage material being cold-stored by refrigerant or being cold-released to cool gas refrigerant evaporated in the evaporator, wherein the second tank has a lower end portion that is positioned lower than a lower end portion of the first tank, and the second tank has a tank capacity capable of storing a predetermined liquid refrigerant condensed by cold storage heat of the cold storage material; and the cold storage heat exchanger further includes a second partition member which partitions an inner space of the second tank into a first space communicating with the tubes other than the one tube and a second space communicating with the one tube;

the second partition member has an opening portion at a bottom side; and the one tube extends to a portion adjacent to the lower end portion of the second tank.

6. A cold storage tank unit for a refrigeration cycle apparatus having an evaporator, the cold storage tank unit being arranged in series with the evaporator on a low pressure side after pressure-reduced in the refrigeration cycle apparatus, the cold storage tank unit comprising:

a cold storage heat exchanger including a plurality of tubes extending in a tube longitudinal direction in which refrigerant flows, and a pair of first and second tanks connected to longitudinal ends of the tubes at two end sides in the tube longitudinal direction to communicate with the tubes;

a cold storage material tank which accommodates at least the tubes of the cold storage heat exchanger; and a cold storage material filled in the cold storage material tank, the cold storage material being cold-stored by refrigerant or being cold-released to cool gas refrigerant evaporated in the evaporator, wherein the second tank has a lower end portion that is positioned lower than a lower end portion of the first tank, and the second tank has a tank capacity capable of storing a predetermined liquid refrigerant condensed by cold storage heat of the cold storage material; and the cold storage material tank is a one-end opened container opened at a side of the first tank;

all the cold storage heat exchanger is approximately accommodated in the one-end opened container; and the cold storage heat exchanger includes a seal member through which an outer peripheral surface of the first tank is air-tightly connected to an inner peripheral surface of the cold storage material tank.

7. A cold storage tank unit for a refrigeration cycle apparatus having an evaporator, the cold storage tank unit being arranged in series with the evaporator on a low pressure side after pressure-reduced in the refrigeration cycle apparatus, the cold storage tank unit comprising:

a cold storage heat exchanger including a plurality of tubes extending in a tube longitudinal direction in which refrigerant flows, and a pair of first and second tanks connected to longitudinal ends of the tubes at two end sides in the tube longitudinal direction to communicate with the tubes;

a cold storage material tank which accommodates at least the tubes of the cold storage heat exchanger; and a cold storage material filled in the cold storage material tank, the cold storage material being cold-stored by refrigerant or being cold-released to cool gas refrigerant evaporated in the evaporator, wherein the second tank has a lower end portion that is positioned lower than a lower end portion of the first tank, and the second tank has a tank capacity capable of storing a predetermined liquid refrigerant condensed by cold storage heat of the cold storage material; and the cold storage material tank is a container enclosing all of the cold storage heat exchanger, and has an inlet portion at a position corresponding to the inflow portion and an outlet portion at a position corresponding to the outflow portion, the cold storage tank unit further comprising a seal member interposed between the inflow portion of the cold storage heat exchanger and the inlet portion of the cold storage material tank, and interposed between the outflow portion of the cold storage heat exchanger and the outlet portion of the cold storage material tank.

8. A cold storage tank unit for a refrigeration cycle apparatus having an evaporator, the cold storage tank unit being arranged in series with the evaporator on a low pressure side after pressure-reduced in the refrigeration cycle apparatus, the cold storage tank unit comprising:

a cold storage heat exchanger including a plurality of tubes extending in a tube longitudinal direction in which refrigerant flows, and a pair of first and second tanks connected to longitudinal ends of the tubes at two end sides in the tube longitudinal direction to communicate with the tubes;

a cold storage material tank which accommodates at least the tubes of the cold storage heat exchanger; and a cold storage material filled in the cold storage material tank, the cold storage material being cold-stored by refrigerant or being cold-released to cool gas refrigerant evaporated in the evaporator, wherein the second tank has a lower end portion that is positioned lower than a lower end portion of the first tank, and the second tank has a tank capacity capable of storing a predetermined liquid refrigerant condensed by cold storage heat of the cold storage material; and the cold storage heat exchanger includes a plurality of fins located to thermally contact the tubes.

9. The cold storage tank unit according to claim 1, further comprising a first connection portion through which the second tank communicates with an exterior part; and a second connection portion extending from the exterior part to the second tank, wherein:

the plurality of tubes are constructed of a first tube group communicating with the first space of the first tank, and a second tube group communicating with the second space of the first tank; and the second connection portion communicates with the second tube group.

10. The cold storage tank unit according to claim 9, further comprising a check valve located in the second tank to allow one refrigerant flow from the second tank to the second tube group.

11. The cold storage tank unit according to claim 9, wherein the second tube group is one tube having a passage sectional area approximately corresponding to a refrigerant pipe connected to the evaporator, or plural tubes.

12. The cold storage tank unit according to claim 1, wherein:

the second tank includes an upper tank part having a specification approximately equal to the first tank, and a lower tank part located at a lower side of the upper tank part in the second tank to directly communicate with the upper tank part.

13. The cold storage tank unit according to claim 12, wherein the lower tank part in the second tank has approximately a cylindrical shape.

14. The cold storage tank unit according to claim 1, wherein the inflow portion and the outflow portion are arranged adjacent to each other, and are constructed by a single joint.

15. A refrigeration cycle apparatus having an evaporator, the cold storage tank unit being arranged in series with the evaporator on a low pressure side after pressure-reduced in the refrigeration cycle apparatus, the cold storage tank unit comprising:

- a cold storage heat exchanger including a plurality of tubes extending in a tube longitudinal direction in which refrigerant flows, and a pair of first and second tanks connected to longitudinal ends of the tubes at two end sides in the tube longitudinal direction to communicate with the tubes;
- a cold storage material tank which accommodates at least the tubes of the cold storage heat exchanger; and
- a cold storage material filled in the cold storage material tank, the cold storage material being cold-stored by refrigerant or being cold-released to cool gas refrigerant evaporated in the evaporator, wherein the second tank has a lower end portion that is positioned lower than a lower end portion of the first tank, and the second tank has a tank capacity capable of storing a predetermined liquid refrigerant condensed by cold storage heat of the cold storage material; and the refrigeration cycle apparatus further including:

- a compressor for compressing refrigerant;
- a condenser for cooling and condensing the refrigerant from the compressor;
- a pressure reducing unit for decompressing refrigerant from the condenser; and
- a piping for connecting the compressor, the condenser, the pressure reducing unit and the evaporator in this order, wherein the cold storage tank unit is located between the evaporator and the compressor such that refrigerant from the evaporator flows in the cold storage heat exchanger.

16. The refrigeration cycle apparatus according to claim 15, further comprising an internal heat exchanger located to perform a heat exchange between refrigerant between the cold storage tank unit and the compressor, and refrigerant between the condenser and the pressure reducing unit.

17. The refrigeration cycle apparatus according to claim 15, wherein the pressure reducing unit is a thermal expansion valve having a throttle open degree changeable based on a temperature of refrigerant flowing out of the evaporator, the apparatus further comprising a bypass passage through which refrigerant from the condenser bypasses the thermal expansion valve; and a fixed throttle located in the bypass passage.

18. The refrigeration cycle apparatus according to claim 15, wherein:

the evaporator is located in an air conditioning case through which air flows into a compartment; and the cold storage tank unit is located outside of the air conditioning case.

19. The refrigeration cycle apparatus according to claim 18, further comprising a receiver located between the condenser and the pressure reducing unit, for storing liquid refrigerant, wherein:

the evaporator is disposed to cool air in the air conditioning case by absorbing heat from air;

the cold storage material stores cold by refrigerant flowing through the cold storage heat exchanger when the compressor operates; and the cold storage material releases cold to condense refrigerant in the cold storage material tank when the compressor stops.

* * * * *